United States Patent
Hendry et al.

(10) Patent No.: US 12,289,463 B2
(45) Date of Patent: *Apr. 29, 2025

(54) IMAGE ENCODING/DECODING METHOD AND DEVICE BASED ON HYBRID NAL UNIT TYPE, AND RECORDING MEDIUM FOR STORING BITSTREAM

(71) Applicant: LG ELECTRONICS INC., Seoul (KR)

(72) Inventors: Hendry Hendry, Seoul (KR); Seung Hwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/371,232

(22) Filed: Sep. 21, 2023

(65) Prior Publication Data
US 2024/0098291 A1     Mar. 21, 2024

Related U.S. Application Data

(63) Continuation of application No. 17/951,581, filed on Sep. 23, 2022, now Pat. No. 11,818,380, which is a (Continued)

(51) Int. Cl.
*H04N 19/46* (2014.01)
*H04N 19/169* (2014.01)
*H04N 19/174* (2014.01)

(52) U.S. Cl.
CPC ........... *H04N 19/46* (2014.11); *H04N 19/174* (2014.11); *H04N 19/188* (2014.11)

(58) Field of Classification Search
CPC .... H04N 19/46; H04N 19/174; H04N 19/188; H04N 21/8455; H04N 21/85406;
(Continued)

(56) References Cited

U.S. PATENT DOCUMENTS 11,818,380 B2 * 11/2023 Hendry .............. H04N 21/8455
2023/0022497 A1 * 1/2023 Wang .................... H04N 19/105

FOREIGN PATENT DOCUMENTS

JP          2023501621 A      1/2023

* cited by examiner

*Primary Examiner* — Tat C Chio
(74) *Attorney, Agent, or Firm* — Bryan Cave Leighton Paisner LLP

(57) ABSTRACT

An image encoding/decoding method and apparatus are provided. The image decoding method includes obtaining, from a bitstream, network abstraction layer (NAL) unit type information of at least one NAL unit including coded image data, determining at least one NAL unit type of one or more slices in the current picture based on the obtained NAL unit type information, and decoding the current picture based on the determined NAL unit type. The current picture is determined to be a random access skipped leading (RASL) picture, based on the determined NAL unit type including a RASL picture NAL unit type (RASL_NUT). When an intra random access point (IRAP) picture associated with the RASL picture is a first picture in decoding order, the RASL picture is decoded, based on the RASL picture including one or more slices having a random access decodable leading (RADL) picture NAL unit type (RADL_NUT).

3 Claims, 18 Drawing Sheets

Related U.S. Application Data continuation of application No. PCT/KR2021/003560, filed on Mar. 23, 2021.

(60) Provisional application No. 62/993,668, filed on Mar. 23, 2020.

(58) Field of Classification Search
CPC .... H04N 19/70; H04N 19/105; H04N 19/119; H04N 19/44
See application file for complete search history.

FIG. 7

| pic_parameter_set_rbsp( ) { | Descriptor |
|---|---|
| ... | |
| no_pic_partition_flag | u(1) |
| if( !no_pic_partition_flag ) { | |
| ... | |
| } | |
| entropy_coding_sync_enabled_flag | u(1) |
| if( !no_pic_partition_flag \|\| entropy_coding_sync_enabled_flag ) | |
| entry_point_offsets_present_flag | u(1) |
| ... | u(1) |
| } | |

FIG. 8

| slice_header( ) { | Descriptor |
|---|---|
| ... | |
| if( entry_point_offsets_present_flag && NumEntryPoints > 0 ) { | |
| offset_len_minus1 | ue(v) |
| for( i = 0; i < NumEntryPoints; i++ ) | |
| entry_point_offset_minus1[ i ] | u(v) |
| } | |
| ... | |
| } | |

FIG. 9

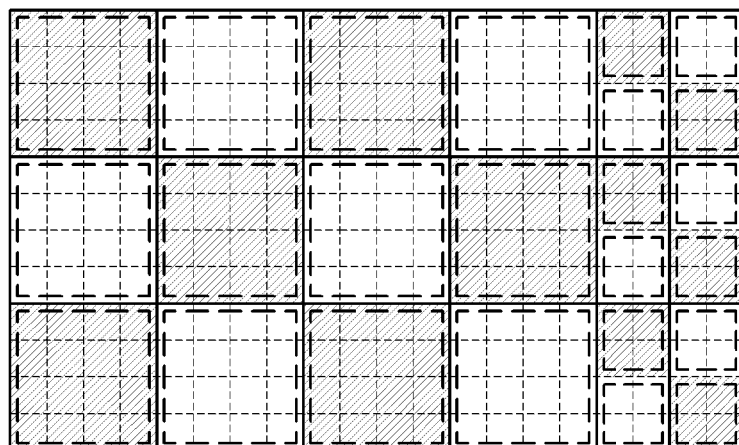

| pic_parameter_set_rbsp( ) { | Descriptor |
|---|---|
| ... | |
| mixed_nalu_types_in_pic_flag | |
| ... | |
| no_pic_partition_flag | u(1) |
| subpic_id_mapping_present_flag | u(1) |
| if( subpic_id_mapping_present_flag ) { | |
|   if( !no_pic_partition_flag ) | |
|     num_subpics_minus1 | ue(v) |
|     subpic_id_len_minus1 | ue(v) |
|     for( i = 0; i <= num_subpics_minus1; i++ ) | |
|       subpic_id[ i ] | u(v) |
| } | |
| ... | |

FIG. 12

| seq_parameter_set_rbsp( ) { | Descriptor |
|---|---|
| ... | |
| subpics_present_flag | u(1) |
| if( subpics_present_flag ) { | |
|    sps_num_subpics_minus1 | u(8) |
|    for( i = 0; i <= sps_num_subpics_minus1; i++ ) { | |
|       subpic_ctu_top_left_x[ i ] | u(v) |
|       subpic_ctu_top_left_y[ i ] | u(v) |
|       subpic_width_minus1[ i ] | u(v) |
|       subpic_height_minus1[ i ] | u(v) |
|       subpic_treated_as_pic_flag[ i ] | u(1) |
|       loop_filter_across_subpic_enabled_flag[ i ] | u(1) |
|    } | |
| } | |
| ... | |
| } | |

IMAGE ENCODING/DECODING METHOD AND DEVICE BASED ON HYBRID NAL UNIT TYPE, AND RECORDING MEDIUM FOR STORING BITSTREAM

This application is a continuation application of U.S. patent application Ser. No. 17/951,581, filed on Sep. 23, 2022, which is a continuation of International Application No. PCT/KR2021/003560, filed on Mar. 23, 2021, which claims the benefit of U.S. Provisional Application No. 62/993,668, filed on Mar. 23, 2020, the contents of which are all hereby incorporated by reference herein in their entirety.

TECHNICAL FIELD

The present disclosure relates to an image encoding/decoding method and apparatus, and, more particularly, to an image encoding and decoding method and apparatus based on a mixed NAL unit type, and a recording medium for storing bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus based on a mixed NAL unit type.

Another object of the present disclosure is to provide an image encoding/decoding method and apparatus based on subpicture merging operation.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

According to an aspect of the present disclosure, an image decoding method includes obtaining, from a bitstream, network abstraction layer (NAL) unit type information of at least one NAL unit including coded image data of a current picture, determining at least one NAL unit type of one or more slices in the current picture based on the obtained NAL unit type information, and decoding the current picture based on the determined NAL unit type. The current picture may be determined to be a random access decodable leading (RASL) picture based on the determined NAL unit type including a RASL_NUT. When an intra random access point (RAP) picture is a first picture in decoding order, the RASL picture may be decoded based on that the RASL picture includes one or more slices having a RADL_NUT.

According to another aspect of the present disclosure, an image decoding apparatus includes a memory and at least one processor. The at least one processor may obtain, from a bitstream, network abstraction layer (NAL) unit type information of at least one NAL unit including coded image data of a current picture, determine at least one NAL unit type of one or more slices in the current picture based on the obtained NAL unit type information, and decode the current picture based on the determined NAL unit type. The current picture may be determined to be a random access decodable leading (RASL) picture based on the determined NAL unit type including a RASL_NUT. When an intra random access point (TRAP) picture is a first picture in decoding order, the RASL picture may be decoded based on that the RASL picture includes one or more slices having a RADL_NUT.

According to another aspect of the present disclosure, an image encoding method includes partitioning a current picture into a plurality of subpictures, determining a network abstraction layer (NAL) unit type of each of the plurality of subpictures, and encoding the plurality of subpictures based on the determined NAL unit type. The current picture may be determined to be a random access decodable leading (RASL) picture based on the determined NAL unit type including a RASL_NUT and the RASL picture may include at least one subpicture having a RADL_NUT.

In addition, a computer-readable recording medium according to another aspect of the present disclosure may store the bitstream generated by the image encoding apparatus or the image encoding method of the present disclosure.

In a transmission method according to another aspect of the present disclosure, a bitstream generated by an image encoding method or an image encoding apparatus of the present disclosure may be transmitted.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus based on a mixed NAL unit type.

Also, according to the present disclosure, it is possible to provide an image encoding/decoding method and apparatus based on a RASL picture being associated with a first picture in decoding order and decodable.

Also, according to the present disclosure, it is possible to provide an image encoding/decoding method and apparatus based on a RASL picture which may be used as a reference picture.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 7 is a view illustrating a picture parameter set (PPS) according to an embodiment of the present disclosure.

FIG. 8 is a view illustrating a slice header according to an embodiment of the present disclosure.

FIG. 9 is a view illustrating an example of a subpicture.

FIG. 12 is a view illustrating an example of a sequence parameter set (SPS) according to an embodiment of the present disclosure.

MODE FOR INVENTION

Figure 1:
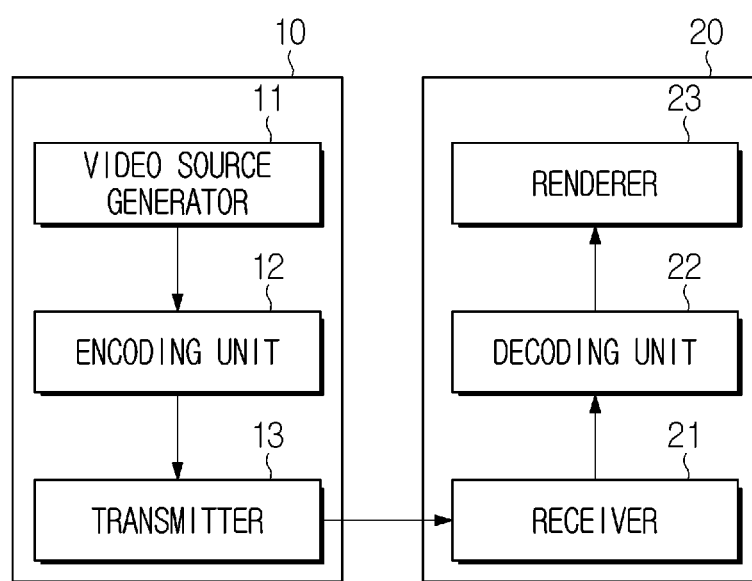
FIG. 1 is a view schematically illustrating a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The luma component block of the current block may be expressed by including an explicit description of a luma component block such as "luma block" or "current luma block. In addition, the "chroma component block of the current block" may be expressed by including an explicit description of a chroma component block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view illustrating a video coding system according to the present disclosure.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
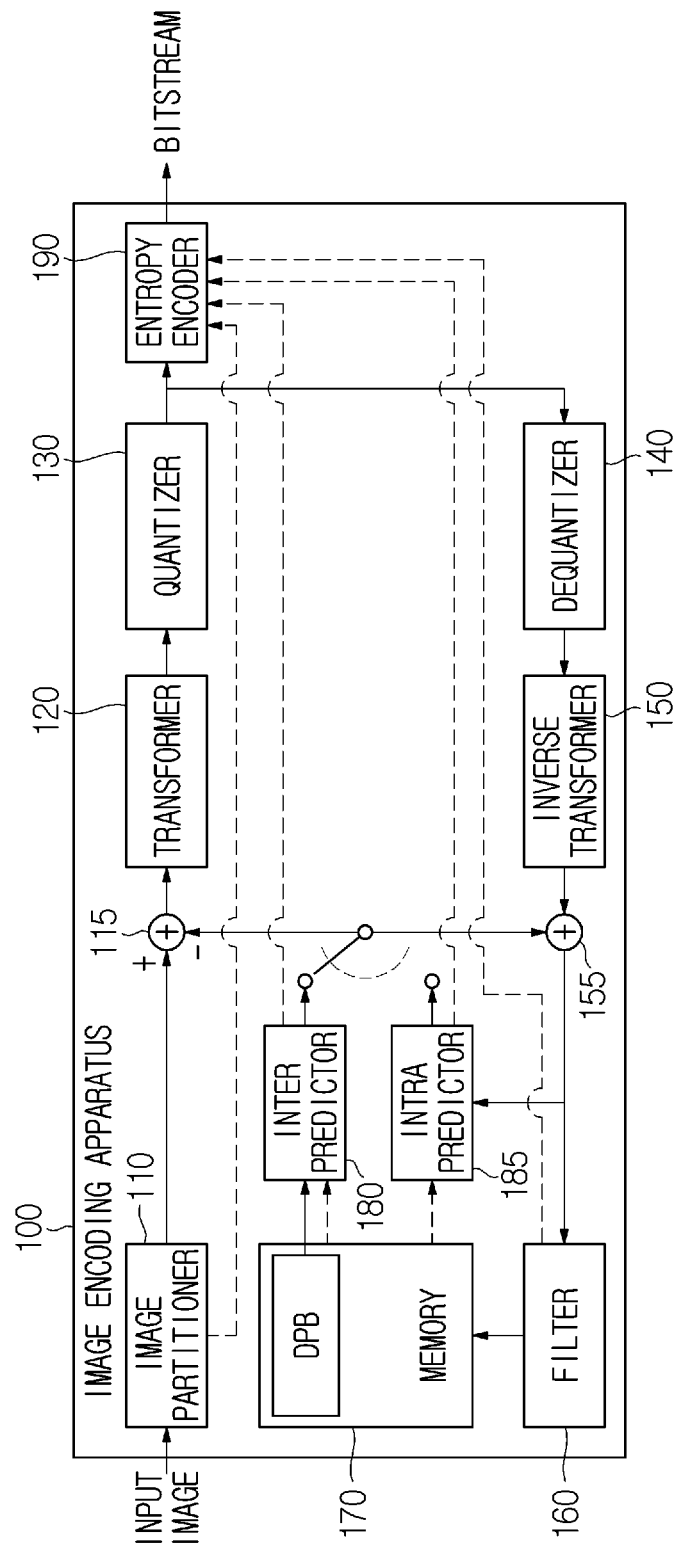
FIG. 2 is a view schematically illustrating an image encoding apparatus, to which an embodiment of the present disclosure is applicable.

FIG. 2 is a view schematically illustrating an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be collectively referred to as a "predictor". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory

170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The predictor (the inter predictor 180 or the intra predictor 185) may perform prediction on a block to be processed (current block) and generate a predicted block including prediction samples for the current block. The predictor may determine whether intra prediction or inter prediction is applied on a current block or CU basis. The predictor may generate various information related to prediction of the current block and transmit the generated information to the entropy encoder 190. The information on the prediction may be encoded in the entropy encoder 190 and output in the form of a bitstream.

The intra predictor 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 185 may determine the prediction mode applied to the current block by using a prediction mode applied to a neighboring block.

The inter predictor 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter predictor 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The predictor may generate a prediction signal based on various prediction methods and prediction techniques described below. For example, the predictor may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the predictor may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the predictor may be used to generate a reconstructed signal or to generate a residual signal. The subtractor 115 may generate a residual signal (residual block or residual sample array) by subtracting the prediction signal (predicted block or prediction sample array) output from the predictor from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter predictor 180 or the intra predictor 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter predictor 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter predictor 180. The memory 170 may store the motion information of the block from which the motion information in the current picture is derived (or encoded) and/or the motion information of the blocks in the picture that have already been reconstructed. The stored motion information may be transmitted to the inter predictor 180 and used as the motion information of the spatial neighboring block or the motion information of the temporal neighboring block. The memory 170 may store reconstructed samples of reconstructed blocks in the current picture and may transfer the reconstructed samples to the intra predictor 185.

Overview of Image Decoding Apparatus

Figure 3:
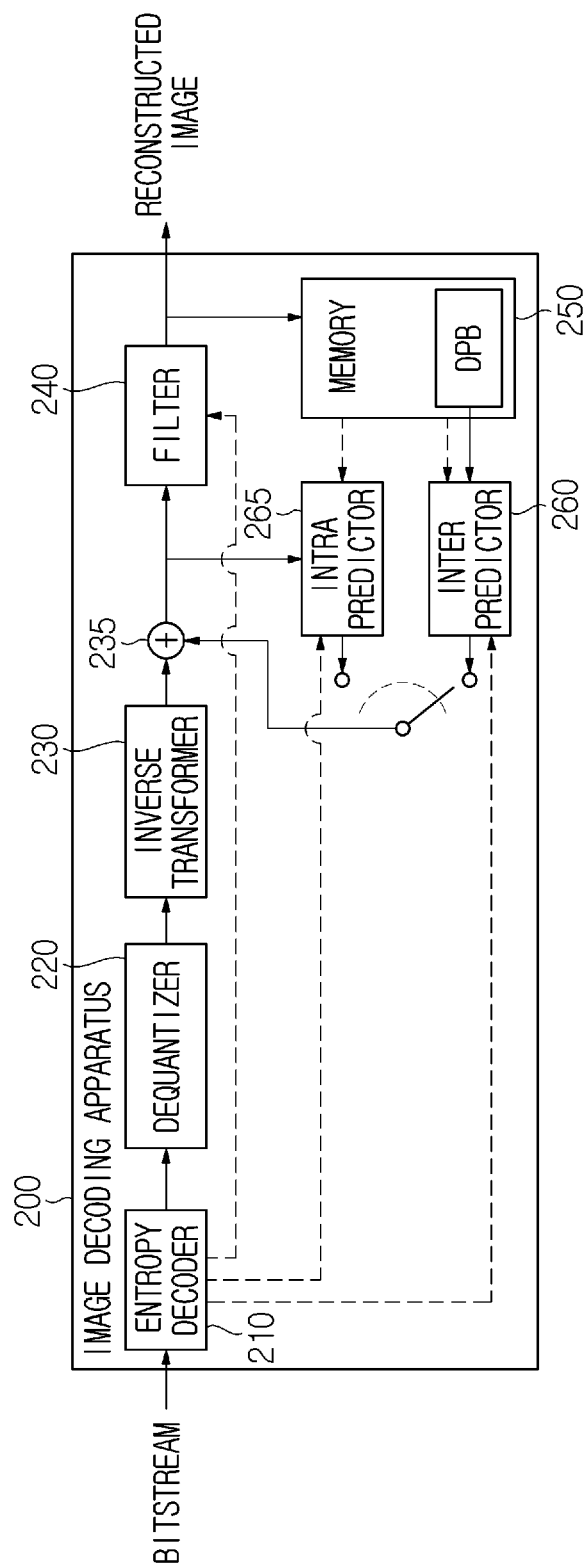
FIG. 3 is a view schematically illustrating an image decoding apparatus, to which an embodiment of the present disclosure is applicable.

FIG. 3 is a view schematically illustrating an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively referred to as a "predictor". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the predictor (the inter predictor 260 and the intra predictor 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter predictor 160 or the intra predictor 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 210 and may determine a specific intra/inter prediction mode (prediction technique).

It is the same as described in the predictor of the image encoding apparatus 100 that the predictor may generate the prediction signal based on various prediction methods (techniques) which will be described later.

The intra predictor 265 may predict the current block by referring to the samples in the current picture. The description of the intra predictor 185 is equally applied to the intra predictor 265.

The inter predictor 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the predictor (including the inter predictor 260 and/or the intra predictor 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter predictor 260. The memory 250 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 250 may store reconstructed samples of reconstructed blocks in the current picture and transfer the reconstructed samples to the intra predictor 265.

In the present disclosure, the embodiments described in the filter 160, the inter predictor 180, and the intra predictor 185 of the image encoding apparatus 100 may be equally or correspondingly applied to the filter 240, the inter predictor 260, and the intra predictor 265 of the image decoding apparatus 200.

General Image/Video Coding Procedure

In image/video coding, a picture configuring an image/video may be encoded/decoded according to a decoding order. A picture order corresponding to an output order of the decoded picture may be set differently from the decoding order, and, based on this, not only forward prediction but also backward prediction may be performed during inter prediction.

Figure 4:
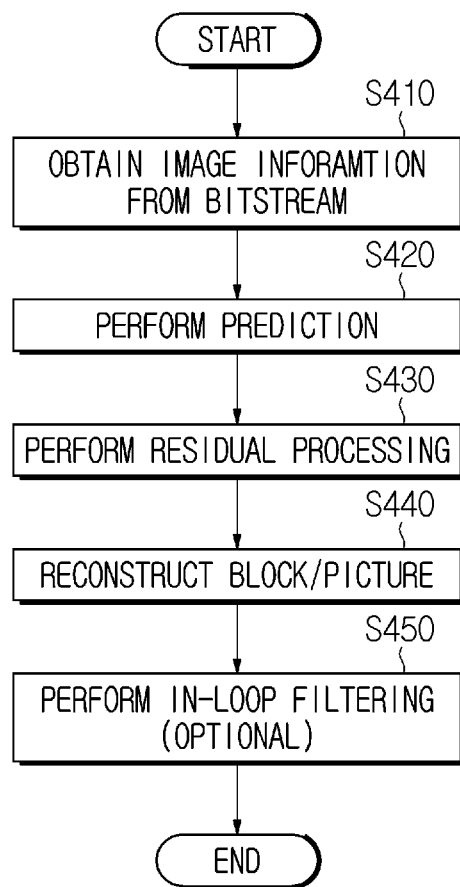
FIG. 4 is a schematic flowchart of an image decoding procedure, to which an embodiment of the present disclosure is applicable.

FIG. 4 shows an example of a schematic picture decoding procedure, to which embodiment(s) of the present disclosure is applicable.

Each procedure shown in FIG. 4 may be performed by the image decoding apparatus of FIG. 3. For example, in FIG. 4, step S410 may be performed by the entropy decoder 210, step S420 may be performed by a predictor including the intra predictor 265 and the inter predictor 260, step S430 may be performed by a residual processor including the dequantizer 220 and the inverse transformer 230, step S440 may be performed by the adder 235, and step S450 may be performed by the filter 240. Step S410 may include the information decoding procedure described in the present disclosure, step S420 may include the inter/intra prediction procedure described in the present disclosure, step S430 may include a residual processing procedure described in the present disclosure, step S440 may include the block/picture reconstruction procedure described in the present disclosure, and step S450 may include the in-loop filtering procedure described in the present disclosure.

Referring to FIG. 4, the picture decoding procedure may schematically include a procedure (S410) for obtaining image/video information (through decoding) from a bitstream, a picture reconstruction procedure (S420 to S440) and an in-loop filtering procedure (S450) for a reconstructed picture. The picture reconstruction procedure may be performed based on prediction samples and residual samples obtained through inter/intra prediction (S420) and residual processing (S430) (dequantization and inverse transform of the quantized transform coefficient) described in the present disclosure. A modified reconstructed picture may be generated through the in-loop filtering procedure for the reconstructed picture generated through the picture reconstruction procedure, the modified reconstructed picture may be output as a decoded picture, stored in a decoded picture buffer or memory 250 of the decoding apparatus and used as a reference picture in the inter prediction procedure when decoding the picture later. In some cases, the in-loop filtering procedure may be omitted. In this case, the reconstructed picture may be output as a decoded picture, stored in a decoded picture buffer or memory 250 of the decoding apparatus, and used as a reference picture in the inter prediction procedure when decoding the picture later. The in-loop filtering procedure (S450) may include a deblocking filtering procedure, a sample adaptive offset (SAO) procedure, an adaptive loop filter (ALF) procedure and/or a bi-lateral filter procedure, as described above, some or all of which may be omitted. In addition, one or some of the deblocking filtering procedure, the sample adaptive offset (SAO) procedure, the adaptive loop filter (ALF) procedure and/or the bi-lateral filter procedure may be sequentially applied or all of them may be sequentially applied. For example, after the deblocking filtering procedure is applied to the reconstructed picture, the SAO procedure may be performed. Alternatively, for example, after the deblocking filtering procedure is applied to the reconstructed picture, the ALF procedure may be performed. This may be similarly performed even in the encoding apparatus.

Figure 5:
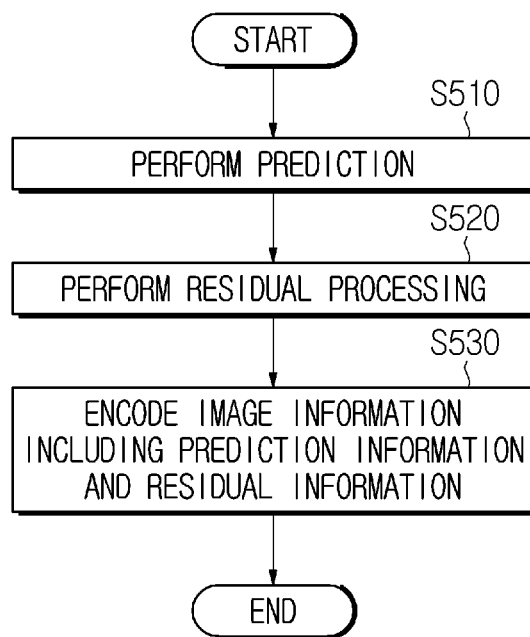
FIG. 5 is a schematic flowchart of an image encoding procedure, to which an embodiment of the present disclosure is applicable.

FIG. 5 shows an example of a schematic picture encoding procedure, to which embodiment(s) of the present disclosure is applicable.

Each procedure shown in FIG. 5 may be performed by the image encoding apparatus of FIG. 2. For example, step S510 may be performed by the predictor including the intra predictor 185 and the inter predictor 180, step S520 may be performed by a residual processor 115, 120 and 130, and step S530 may be performed by the entropy encoder 190. Step S510 may include the inter/intra prediction procedure described in the present disclosure, step S520 may include the residual processing procedure described in the present disclosure, and step S530 may include the information encoding procedure described in the present disclosure.

Referring to FIG. 5, the picture encoding procedure may schematically include not only a procedure for encoding and outputting information for picture reconstruction (e.g., prediction information, residual information, partitioning information, etc.) in the form of a bitstream but also a procedure for generating a reconstructed picture for a current picture and a procedure (optional) for applying in-loop filtering to a reconstructed picture. The encoding apparatus may derive (modified) residual samples from a quantized transform coefficient through the dequantizer 140 and the inverse transformer 150, and generate the reconstructed picture based on the prediction samples which are output of step S510 and the (modified) residual samples. The reconstructed picture generated in this way may be equal to the reconstructed picture generated in the decoding apparatus. The modified reconstructed picture may be generated through the in-loop filtering procedure for the reconstructed picture. In this case, the modified reconstructed picture may be stored in the decoded picture buffer of a memory 170, and may be used as a reference picture in the inter prediction procedure when encoding the picture later, similarly to the decoding apparatus. As described above, in some cases, some or all of the in-loop filtering procedure may be omitted. When the in-loop filtering procedure is performed, (in-loop) filtering related information (parameter) may be encoded in the entropy encoder 190 and output in the form of a bitstream, and the decoding apparatus may perform the in-loop filtering procedure using the same method as the encoding apparatus based on the filtering related information.

Through such an in-loop filtering procedure, noise occurring during image/video coding, such as blocking artifact and ringing artifact, may be reduced and subjective/objective visual quality may be improved. In addition, by performing the in-loop filtering procedure in both the encoding apparatus and the decoding apparatus, the encoding apparatus and the decoding apparatus may derive the same prediction result, picture coding reliability may be increased and the amount of data to be transmitted for picture coding may be reduced.

As described above, the picture reconstruction procedure may be performed not only in the image decoding apparatus but also in the image encoding apparatus. A reconstructed block may be generated based on intra prediction/inter prediction in units of blocks, and a reconstructed picture including reconstructed blocks may be generated. When a current picture/slice/tile group is an I picture/slice/tile group, blocks included in the current picture/slice/tile group may be reconstructed based on only intra prediction. On the other hand, when the current picture/slice/tile group is a P or B picture/slice/tile group, blocks included in the current picture/slice/tile group may be reconstructed based on intra prediction or inter prediction. In this case, inter prediction may be applied to some blocks in the current picture/slice/tile group and intra prediction may be applied to the remaining blocks. The color component of the picture may include a luma component and a chroma component and the methods and embodiments of the present disclosure are applicable to both the luma component and the chroma component unless explicitly limited in the present disclosure.

Example of Coding Layer Structure

A coded video/image according to the present disclosure may be processed, for example, according to a coding layer and structure which will be described below.

Figure 6:
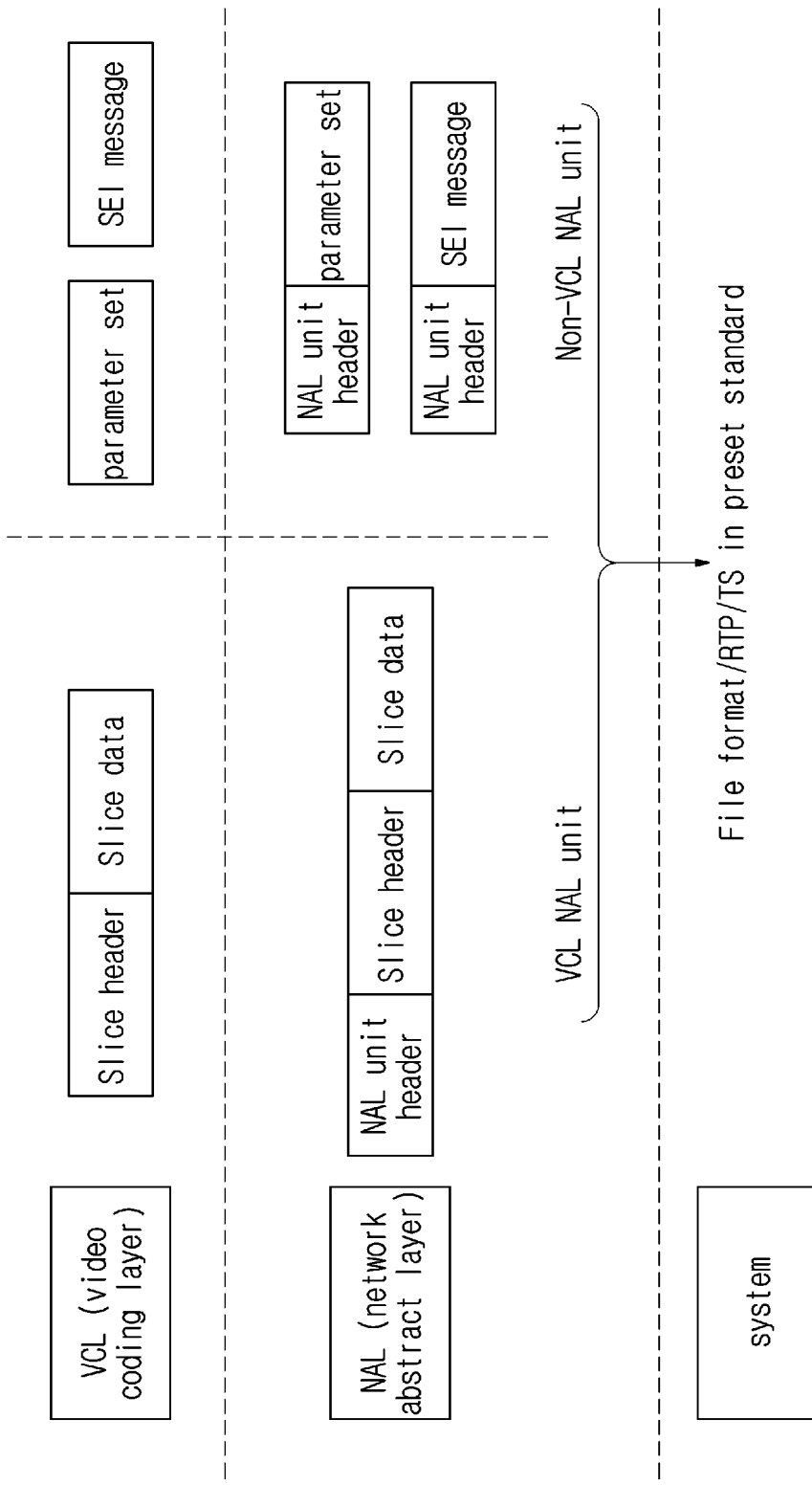
FIG. 6 is a view illustrating an example of a layer structure for a coded image/video.

FIG. 6 is a view illustrating an example of a layer structure for a coded image/video.

The coded image/video is classified into a video coding layer (VCL) for an image/video decoding process and handling itself, a lower system for transmitting and storing encoded information, and a network abstraction layer (NAL) present between the VCL and the lower system and responsible for a network adaptation function.

In the VCL, VCL data including compressed image data (slice data) may be generated or a supplemental enhancement information (SEI) message additionally required for a decoding process of an image or a parameter set including information such as a picture parameter set (PPS), a sequence parameter set (SPS) or a video parameter set (VPS) may be generated.

In the NAL, header information (NAL unit header) may be added to a raw byte sequence payload (RBSP) generated in the VCL to generate a NAL unit. In this case, the RBSP refers to slice data, a parameter set, an SEI message generated in the VCL. The NAL unit header may include NAL unit type information specified according to RBSP data included in a corresponding NAL unit.

As shown in FIG. 6, the NAL unit may be classified into a VCL NAL unit and a non-VCL NAL unit according to the type of the RBSP generated in the VCL. The VCL NAL unit may mean a NAL unit including information on an image (slice data), and the Non-VCL NAL unit may mean a NAL unit including information (parameter set or SEI message) required to decode an image.

The VCL NAL unit and the Non-VCL NAL unit may be attached with header information and transmitted through a network according to the data standard of the lower system. For example, the NAL unit may be modified into a data format of a predetermined standard, such as H.266/VVC file format, RTP (Real-time Transport Protocol) or TS (Transport Stream), and transmitted through various networks.

As described above, in the NAL unit, a NAL unit type may be specified according to the RBSP data structure included in the corresponding NAL unit, and information on the NAL unit type may be stored in a NAL unit header and signaled. For example, this may be largely classified into a VCL NAL unit type and a non-VCL NAL unit type depending on whether the NAL unit includes information on an image (slice data). The VCL NAL unit type may be classified according to the property and type of the picture included in the VCL NAL unit, and the Non-VCL NAL unit type may be classified according to the type of a parameter set.

An example of the NAL unit type specified according to the type of the parameter set/information included in the Non-VCL NAL unit type will be listed below.

DCI (Decoding capability information) NAL unit type (NUT): Type for NAL unit including DCI VPS(Video Parameter Set) NUT: Type for NAL unit including VPS SPS(Sequence Parameter Set) NUT: Type for NAL unit including SPS PPS(Picture Parameter Set) NUT: Type for NAL unit including PPS APS (Adaptation Parameter Set) NUT: Type for NAL unit including APS PH (Picture header) NUT: Type for NAL unit including a picture header The above-described NAL unit types may have syntax information for a NAL unit type, and the syntax information may be stored in a NAL unit header and signaled. For example, the syntax information may be nal_unit_type, and the NAL unit types may be specified using nal_unit_type values.

Meanwhile, one picture may include a plurality of slices, and one slice may include a slice header and slice data. In this case, one picture header may be further added to a plurality of slices (slice header and slice data set) in one picture. The picture header (picture header syntax) may include information/parameters commonly applicable to the picture. The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may information/parameters commonly applicable to multiple layers. The DCI (DCI syntax) may include information/parameters related to decoding capability.

In the present disclosure, a high level syntax (HLS) may include at least one of the APS syntax, the PPS syntax, the SPS syntax, the VPS syntax, the DCI syntax, the picture header syntax or the slice header syntax. In addition, in the present disclosure, a low level syntax (LLS) may include, for example, a slice data syntax, a CTU syntax, a coding unit syntax, a transform unit syntax, etc.

In the present disclosure, image/video information encoded in the encoding apparatus and signaled to the decoding apparatus in the form of a bitstream may include not only in-picture partitioning related information, intra/inter prediction information, residual information, in-loop filtering information but also information on the slice header, information on the picture header, information on the APS, information on the PPS, information on the SPS, information on the VPS and/or information on the DCI. In addition, the image/video information may further include general constraint information and/or information on a NAL unit header.

Overview of Signaling of Entry Points

As described above, a VCL NAL unit may include slice data as RBSP (Raw Byte Sequence Payload). The slice data may be aligned in the VCL NAL unit in bytes, and may include one or more subsets. At least one entry point for random access (RA) may be defined for the subsets, and parallel processing may be performed based on the entry point.

The VVC standard supports wavefront parallel processing (WPP) which is one of various parallel processing techniques. A plurality of slices in a picture may be coded/decoded in parallel based on WPP.

In order to activate parallel processing capability, entry point information may be signaled. An image decoding apparatus may directly access a start point of a data segment included in a NAL unit based on entry point information. Here, the start point of the data segment may mean a start point of tiles in a slice or a start point of CTU rows in a slice.

The entry point information may be signaled in a high level syntax, for example, a picture parameter set (PPS) and/or a slice header.

FIG. 7 is a view illustrating a picture parameter set (PPS) according to an embodiment of the present disclosure, and FIG. 8 is a view illustrating a slice header according to an embodiment of the present disclosure.

First, referring to FIG. 7, the picture parameter set (PPS) may include entry_point_offsets_present_flag as a syntax element indicating whether entry point information is signaled.

entry_point_offsets_present_flag may indicate whether signaling of entry point information is present in a slice header referring to a picture parameter set (PPS). For example, entry_point_offsets_present_flag having a first value (e.g., 0) may indicate that signaling of entry point information for a tile or specific CTU rows in a tile is not present in the slice header. In contrast, entry_point_offsets_present_flag having a second value (e.g., 1) may indicate that signaling of entry point information for a tile or specific CTU rows in a tile is present in the slice header.

Meanwhile, although the case where entry_point_offsets_present_flag is included in the picture parameter set (PPS) is shown in FIG. 7, this is an example and thus the embodiments of the present disclosure are not limited thereto. For example, entry_point_offsets_present_flag may be included in a sequence parameter set (SPS).

Next, referring to FIG. 8, the slice header may include offset_len_minus1 and entry_point_offset_minus1 [i] as syntax elements for identifying an entry point.

offset_len_minus1 may indicate a value obtained by subtracting 1 from the bit length of entry_point_offset_minus1 [i]. The value of offset_len_minus1 may have a range from 0 to 31. In an example, offset_len_minus1 may be signaled based on a variable NumEntryPoints indicating a total number of entry points. For example, offset_len_minus1 may be signaled only when NumEntryPoints is greater than 0. In addition, offset_len_minus1 may be signaled based on the entry_point_offsets_present_flag described above with reference to FIG. 7. For example, when offset_len_minus1 may be signaled only when entry_point_offsets_present_flag has a second value (e.g., 1) (that is, signaling of entry point information is present in the slice header).

entry_point_offset_minus1 [i] may indicate an i-th entry point offset in bytes, and may be expressed by adding 1 bits to offset_len_minus1. Slice data in a NAL unit may include the same number of subsets as a value obtained by adding 1 to NumEntryPoints, and an index value indicating each of the subsets may have a range from 0 to NumEntryPoints. A first byte of slice data in a NAL unit may be expressed by 0.

When entry_point_offset_minus1[i] is signaled, emulation prevention bytes included in the slice data in the NAL unit may be counted as a portion of slice data for subset identification. Subset 0 which is a first subset of slice data may have a configuration from byte 0 to entry_point_offset_minus1 [0]. Similarly, a subset k which is a k-th subset of slice data may have a configuration from firstByte[k] to lastByte[k]. Here, firstByte[k] may be derived as shown in Equation 1 below, lastByte[k] may be derived as shown in Equation 2 below.

$$\text{firstByte}[k] = \Sigma_{n=1}^{k}(sh\_\text{entry\_point\_offset\_minus1}[n-1]+1) \quad \text{[Equation 1]}$$

$$\text{lastByte}[k] = \text{firstByte}[k] + sh\_\text{entry\_point\_offset\_minus1}[k] \quad \text{[Equation 2]}$$

In Equations 1 and 2, k may have a range from 1 to a value obtained by subtracting 1 from NumEntryPoints.

A last subset (that is, NumEntryPoints-th subset) of slice data may be composed of remaining bytes of slice data.

Meanwhile, if a predetermined synchronization process for context variables is not performed before decoding a CTU including a first CTB of a CTB row in each tile (e.g., sps_entropy_coding_sync_enabled_flag==0) and a slice includes one or more complete tiles, each subset of slice header may be composed of all coded bits for all CTUs in the same tile. In this case, a total number of subsets of slice data may be equal to a total number of tiles in a slice.

In contrast, when the predetermined synchronization process is not performed and a slice includes one subset for CTU rows in a single tile, NumEntryPoints may be 0. In this case, one subset of slice data may be composed of all coded bits for all CTUs in a slice.

In contrast, when the predetermined synchronization process is performed (e.g., sps_entropy_coding_sync_enabled_flag==1), each subset may be composed of all coded bits for all CTUs of one CTU row in one tile. In this case, a total number of subsets of slice data may be equal to a total number of CTU rows of each tile in a slice.

Overview of Mixed NAL Unit Type

In general, one NAL unit type may be set for one picture. As described above, syntax information indicating a NAL unit type may be stored in the NAL unit header of a NAL unit and signaled. For example, the syntax information may be nal_unit_type, and NAL unit types may be specified using an nal_unit_type value.

An example of NAL unit types, to which an embodiment of the present disclosure is applicable, is shown in Table 1 below.

TABLE 1

| nal_unit_type | Name of nal_unit_type | Content of NAL unit and RBSP syntax structure | NAL unit type class |
|---|---|---|---|
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RADL_NUT | Coded slice of a RADL picture slice_layer_rbsp( ) | VCL |
| 3 | RASL_NUT | Coded slice of a RASL picture slice_layer_rbsp( ) | VCL |
| 4 . . . 6 | RSV_VCL_4 . . . RSV_VCL_6 | Reserved non-IRAP VCL NAL unit types | VCL |
| 7 | IDR_W_RADL | Coded slice of an IDR picture slice_layer_rbsp( ) | VCL |
| 8 | IDR_N_LP | | |
| 9 | CRA_NUT | Coded slice of a CRA picture silce_layer_rbsp( ) | VCL |
| 10 | GDR_NUT | Coded slice of a GDR picture slice_layer_rbsp( ) | VCL |
| 11 | RSV_IRAP_11 | Reserved IRAP VCL NAL unit types | VCL |
| 12 | RSV_IRAP_12 | | |
| 13 | DCI_NUT | Decoding capability information decoding_capability_information_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 | PREFIX_APS_NUT | Adaptation parameter set adaptation_parameter_set_rbsp( ) | non-VCL |
| 18 | SUFFIX_APS_NUT | | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 | PREFIX_SEI_NUT | Supplemental enhancement information sei_rbsp( ) | non-VCL |
| 24 | SUFFIX_SEI_NUT | | |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28 . . . 31 | UNSPEC_28 . . . UNSPEC_31 | Unspecified non-VCL NAL unit types | non-VCL |

NUT: NAL unit type
STSA: Step-wise Temporal sub-layer Switching Access
RADL: Random Access Decodable Leading
RASL: Random Access Skipped Leading
IDR: Instantaneous Decoding Refresh
LP: Leading Picture
_W_RADL: With RADL
_N_LP: No LP, without LP
CRA: Clean Random Access
GDR: Gradual Decoding Refresh
IRAP: Intra Random Access Point Referring to Table 1, a VCL NAL unit type may be classified into NAL unit types 0 to 12 according to the nature and type of a picture. In addition, a non-VCL NAL unit type may be classified into NAL unit types 13 to 31 according to the type of a parameter set.

Detailed examples of the VCL NAL unit type is as follows.

IRAP (Intra Random Access Point) NAL unit type (NUT): type for a NAL unit of an TRAP picture, which is set to a range from IDR_W_RADL to CRA_NUT.

IDR (Instantaneous Decoding Refresh) NUT: type for a NAL unit of an IDR picture, which is set to IDR_W_RADL or IDR_N_LP.

CRA (Clean Random Access) NUT: type for a NAL unit for a CRA picture, which is set to CRA_NUT.

RADL (Random Access Decodable Leading) NUT: type for a NAL unit for a RADL picture, which is set to RADL_NUT.

RASL (Random Access Skipped Leading) NUT: type for a NAL unit for a RASL picture, which is set to RASL_NUT.

Trailing NUT: type for a NAL unit for a trailing picture, which is set to TRAIL_NUT.

GDR (Gradual Decoding Refresh) NUT: type for a NAL unit for a GDR picture, which is GDR_NUT.

STSA (Step-wise Temporal Sublayer Access) NUT: type for a NAL unit for an STSA picture, which is set to STSA_NUT.

Meanwhile, the VVC standard allows one picture to include a plurality of slices having different NAL unit types. For example, one picture may include at least one first slice having a first NAL unit type and at least two second slices having a second NAL unit type different from the first NAL unit type. In this case, the NAL unit type of the picture may be referred to as a mixed NAL unit type. As the VVC standard supports a mixed NAL unit type, a plurality of pictures may be more easily reconstructed/synthesized in a content synthesis process, an encoding/decoding process, etc.

However, according to an existing scheme for a mixed NAL unit type, there is a problem that the type of a picture having a mixed NAL unit type based on RASL_NUT and RADL_NUT may not be clear. According to the type of the picture, constraints on picture order and, more particularly, a reference picture list, need to be modified to ensure correct picture order in a bitstream.

In order to solve such a problem, according to the embodiments of the present disclosure, a picture having a mixed NAL unit type based on RASL_NUT and RADL_NUT may be treated as a RASL picture. When an IRAP picture associated with the RASL picture is a first picture or a first IRAP picture in decoding order, the output process of the RASL picture may be skipped. However, the decoding process of the RASL picture may be performed, and the RASL picture may be used as a reference picture for inter prediction of a RADL picture under predetermined reference conditions.

Hereinafter, embodiments of the present disclosure will be described in detail with reference to the accompanying drawings.

When one picture has a mixed NAL unit type, the picture may include a plurality of subpictures having different NAL unit types. For example, the picture may include at least one first subpicture having a first NAL unit type and at least one second subpicture having a second NAL unit type.

The subpicture may include one or more slices and construct a rectangular region in a picture. The sizes of the subpictures in a picture may be differently set. On the other hand, for all pictures belonging to one sequence, the sizes and positions of specific individual subpictures may be set equal to each other.

FIG. 9 is a view illustrating an example of a subpicture.

Referring to FIG. 9, one picture may be partitioned into 18 tiles. Twelve tiles may be arranged on the left side of the picture and each tile may include one slice composed of 4×4 CTUs. In addition, six tiles may be arranged on the right side of the picture and each tile may include two slices each including 2×2 CTUs and stacked in a vertical direction. As a result, the picture may include 24 subpictures and 24 slices and each subpicture may include one slice.

In an embodiment, each subpicture in one picture may be treated as one picture to support a mixed NAL unit type. When the subpicture is treated as one picture, the subpicture may be independently coded/decoded regardless of a result of encoding/decoding another subpicture. Here, independent encoding/decoding may mean that a block partitioning structure (e.g., a single tree structure, a dual tree structure, etc.), prediction mode type (e.g., intra prediction, inter prediction, etc.), decoding order, etc. of a subpicture are different from those of another subpicture. For example, when a first subpicture is coded/decoded based on an intra prediction mode, a second subpicture adjacent to the first subpicture and treated as one picture may be coded/decoded based on an inter prediction mode.

Information on whether a subpicture is treated as one picture may be signaled using a syntax element in a high level syntax. For example, sps_subpic_treated_as_pic_flag[i] indicating whether a current subpicture is treated as one picture may be signaled through a sequency parameter set (SPS). When a current subpicture is treated as one picture, sps_subpic_treated_as_pic_flag[i] may have a second value (e.g., 1).

Figures 10, 11:
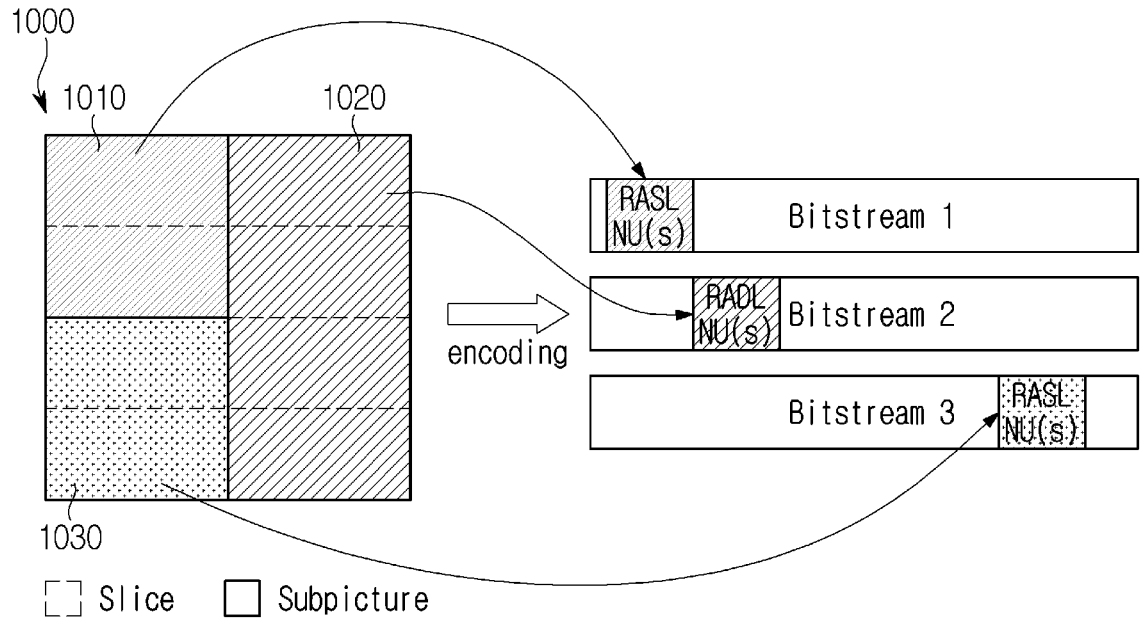
FIG. 10 is a view illustrating an example of a picture having a mixed NAL unit type.
FIG. 11 is a view illustrating an example of a picture parameter set (PPS) according to an embodiment of the present disclosure.

FIG. 10 is a view illustrating an example of a picture having a mixed NAL unit type.

Referring to FIG. 10, one picture 1000 may include first to third subpictures 1010 to 1030. Each of the first and third subpictures 1010 and 1030 may include two slices. In contrast, the second subpicture 1020 may include four slices.

When each of the first to third subpictures 1010 to 1030 is treated as one picture, the first to third subpictures 1010 to 1030 may be independently coded to construct different bitstreams. For example, coded slice data of the first subpicture 1010 may be encapsulated into one or more NAL units having the same NAL unit type as RASL_NUT to construct a first bitstream (Bitstream 1). In addition, coded slice data of the second subpicture 1020 may be encapsulated into one or more NAL units having the same NAL unit type as RADL_NUT to construct a second bitstream (Bitstream 2). In addition, coded slice data of the third subpicture 1030 may be encapsulated into one or more NAL units having the same NAL unit type as RASL_NUT to construct a third bitstream (Bitstream 3). As a result, one picture 1000 may have a mixed NAL unit type in which RASL_NUT and RADL_NUT are mixed.

In an embodiment, all slices included in each subpicture in a picture may be limited to have the same NAL unit type. For example, both two slices included in the first subpicture 101 may have the same NAL unit type as RASL_NUT. In addition, all four slices included in the second subpicture 1020 may have the same NAL unit type as RADL_NUT. In addition, both two slices included in the third subpicture 1030 may have the same NAL unit type as RASL_NUT.

Information on a mixed NAL unit type and information on picture partitioning may be signaled in a high level syntax, for example, a picture parameter set (PPS) and/or a sequence parameter set (SPS).

FIG. 11 is a view illustrating an example of a picture parameter set (PPS) according to an embodiment of the present disclosure, and FIG. 12 is a view illustrating an example of a sequence parameter set (SPS) according to an embodiment of the present disclosure.

First, referring to FIG. 11, the picture parameter set (PPS) may include pps_mixed_nalu_types_in_pic_flag as a syntax element for a mixed NAL unit type.

pps_mixed_nalu_types_in_pic_flag may indicate whether a current picture has a mixed NAL unit type. For example, pps_mixed_nalu_types_in_pic_flag having a first value (e.g., 0) may indicate that a current picture does not have a mixed NAL unit type. In this case, the current picture may have the same NAL unit type for all VCL NAL units, for example, the same NAL unit type as coded slice NAL units. In contrast, pps_mixed_nalu_types_in_pic_flag having a second value (e.g., 1) may indicate that a current picture has a mixed NAL unit type. In this case, the VCL NAL unit of the current picture may be limited not to have the same NAL unit type as GDR_NUT. In addition, when any one VCL NAL unit of the current picture has the same NAL unit type as IDR_W_RADL, IDR_N_LP or CRA_NUT, all different VCL NAL units of the current picture may be limited to have the same NAL unit type as IDR_W_RADL, IDR_N_LP, CRA_NUT or TRAIL_NUT.

When a current picture has a mixed NAL unit type (e.g., pps_mixed_nalu_types_in_pic_flag==1), each subpicture in the current picture may have any one of the VCL NAL unit types described above with reference to Table 1. For example, when a subpicture in the current picture is an IDR subpicture, the subpicture may have the same NAL unit type as IDR_W_RADL or IDR_N_LP. Alternatively, when a subpicture in the current picture is a trailing subpicture, the subpicture may have the same NAL unit type as TRAIL_NUT.

pps_mixed_nalu_types_in_pic_flag having a second value (e.g., 1) may indicate that pictures referring to a picture parameter set (PPS) may include slices having different NAL unit types. Here, the pictures may originate from subpicture bitstream merge operation in which an encoder ensures matching of a bitstream structure and alignment between parameters of original bitstreams. As an example of alignment, when reference picture list (RPL) syntax elements for a slice having the same NAL unit as IDR_W_RADL or IDR_N_LP are not present in a slice header (e.g., sps_idr_rpl_present_flag==0) and a current picture including the slice does not have a mixed NAL unit type (e.g., pps_mixed_nalu_types_in_pic_flag==1), the current picture may be limited not to include slices of the same NAL unit type as IDR_W_RADL or IDR_N_LP.

Meanwhile, when there is a limitation that a mixed NAL unit type is not applied (e.g., gci_no_mixed_nalu_types_in_pic_constraint_flag==1) for all pictures in an output layer set (OLS), pps_mixed_nalu_types_in_pic_flag may have a first value (e.g., 0).

In addition, a picture parameter set (PPS) may include pps_no_pic_partition_flag as a syntax element for picture partitioning.

pps_no_pic_partition_flag may indicate whether picture partitioning is applicable to a current picture. For example, pps_no_pic_partition_flag having a first value (e.g., 0) may indicate that a current picture cannot be partitioned. In contrast, pps_no_pic_partition_flag having a second value (e.g., 1) may indicate that a current picture may be partitioned into two or more tiles or slices. When a current picture has a mixed NAL unit type (e.g., pps_mixed_nalu_types_in_pic_flag==1), the current picture may be limited to be partitioned into two or more tiles or slices (e.g., pps_no_pic_partition_flag=1).

In addition, a picture parameter set (PPS) may include pps_num_subpics_minus1 as a syntax element indicating the number of subpictures.

pps_num_subpics_minus1 may indicate a value obtained by subtracting 1 from the number of subpictures included in a current picture. pps_num_subpics_minus1 may be signaled only when picture partitioning is applicable to a current picture (e.g., pps_no_pic_partition_flag==1). When pps_num_subpics_minus1 is not signaled, the value of pps_num_subpics_minus1 may be inferred as 0. Meanwhile, a syntax element indicating the number of subpictures may be signaled in a high level syntax different from a picture parameter set (PPS), for example, a sequence parameter set (SPS).

In an embodiment, when a current picture includes only one subpicture (e.g., pps_num_subpics_minus1==0), the current picture may be limited not to have a mixed NAL unit type (e.g., pps_mixed_nalu_types_in_pic_flag==0). That is, when a current picture has a mixed NAL unit type (e.g., pps_mixed_nalu_types_in_pic_flag==1), the current picture may be limited to include two or more subpictures (e.g., pps_num_subpics_minus1>0).

Next, referring to FIG. 12, the sequence parameter set (SPS) may include sps_subpic_treated_as_pic_flag[i] as a syntax element related to treatment of a subpicture during encoding/decoding.

sps_subpic_treated_as_pic_flag[i] may indicate whether each subpicture in a current picture is treated as one picture. For example, sps_subpic_treated_as_pic_flag[i] having a first value (e.g., 0) may indicate that an i-th subpicture in a current picture is not treated as one picture. In contrast, sps_subpic_treated_as_pic_flag[i] having a second value (e.g., 1) may indicate that an i-th subpicture in a current picture is treated as one picture in an encoding/decoding process excluding in-loop filtering operation. When sps_subpic_treated_as_pic_flag[i] is not signaled, sps_subpic_treated_as_pic_flag[i] may be inferred to have a second value (e.g., 1).

In an embodiment, when a current picture includes two or more subpictures (e.g., pps_num_subpics_minus1>0) and at least one of the subpictures is not treated as one picture (e.g., sps_subpic_treated_as_pic_flag[i]==0), the current picture may be limited not to have a mixed NAL unit type (e.g., pps_mixed_nalu_types_in_pic_flag=0). That is, when a current picture has a mixed NAL unit type (e.g., pps_mixed_nalu_types_in_pic_flag==1), all subpictures in the current picture may be limited to be treated as one picture.

Hereinafter, a NAL unit type according to the embodiments of the present disclosure will be described in detail for each picture type.

(1) IRAP (Intra Random Access Point) Picture

An IRAP picture is a randomly accessible picture and may have the same NAL unit type such as IDR_W_RADL, IDR_N_LP or CRA_NUT as described above with reference to Table 1. The IRAP picture may not refer to a picture other than the IRAP picture for inter prediction in a decoding process. The TRAP picture may include an IDR (Instantaneous decoding refresh) picture and a CRA (Clean random access) picture.

A first picture in a bitstream in a decoder order may be limited to an IRAP picture or a GDR (Gradual Decoding Refresh) picture. For a single layer bitstream, when an essential parameter set to be referred to is available, although pictures preceding an IRAP picture in decoding order are not decoded at all, the IRAP picture and all non-RASL pictures following the IRAP picture in decoding order may be correctly decoded.

In an embodiment, an TRAP picture may not have a mixed NAL unit type. That is, for an TRAP picture, pps_mixed_nalu_types_in_pic_flag may have a first value (e.g., 0), and all slices in the TRAP picture may have the same NAL unit type in a range from IDR_W_RADL to CRA_NUT. As a result, when a first slice received from a predetermined picture has a NAL unit type in a range from IDR_W_RADL to CRA_NUT, the picture may be determined as an TRAP picture.

(2) CRA (Clean Random Access) Picture

A CRA picture is one of TRAP pictures and may have the same NAL unit type as CRA_NUT as described above with reference to Table 1. The CRA picture may not refer to a picture other than the CRA picture for inter prediction in a decoding process.

A CRA picture may be a first picture in a bitstream in decoding order or a picture after the first picture. The CRA picture may be associated with RADL or RASL pictures.

When NoIncorrectPicOutputFlag has a second value (e.g., 1) for a CRA picture, RASL pictures associated with the CRA picture refer to pictures which are not present in a bitstream and thus may not be decoded and, as a result, may not be output by an image decoding apparatus. Here, NoIncorrectPicOutputFlag may indicate whether pictures preceding a recovery point picture in decoding order are output before the recovery point picture. For example, NoIncorrectPicOutputFlag having a first value (e.g., 0) may indicate that the pictures preceding the recovery point picture in decoding order are output before the recovery point picture. In this case, the CRA picture may not be a first picture in a bitstream or a first picture following an end of sequence (EOS) NAL unit in decoding order, which may mean that random access does not occur. In contrast, NoIncorrectPicOutputFlag having a second value (e.g., 1) may indicate that the pictures preceding the recovery point picture in decoding order cannot be output before the recovery point picture. In this case, the CRA picture may be a first picture in a bitstream or a first picture following an end of sequence (EOS) NAL unit in decoding order, which may mean that random access occurs. Meanwhile, NoIncorrectPicOutputFlag may be referred to as NoOutputBeforeRecoveryFlag in some embodiments.

For all picture units (PUs) following a current picture in decoding order within a CLVS (coded layer video sequence), Reference picture list 0 (e.g., RefPicList[0]) and Reference picture list 1 (e.g., RefPicList[1]) for one slice included in a CRA subpicture belonging to the picture units (PUs) may be limited not to include any picture preceding a picture including the CRA subpicture in decoding order within an active entry. Here, the picture unit (PU) may mean a NAL unit set including a plurality of NAL units which are mutually associated according to a predetermined classification rule and are continuous in decoding order for one coded picture.

(3) IDR (Instantaneous Decoding Refresh) Picture

An IDR picture is one of TRAP pictures, and may have the same NAL unit type as IDR_W_RADL or IDR_N_LP as described above with reference to Table 1. The IDR picture may not refer to a picture other than the IDR picture for inter prediction in a decoding process.

An IDR picture may be a first picture in a bitstream in decoding order or may be a picture after the first picture. Each IDR picture may be a first picture of a CVS (Coded Video Sequence) in decoding order.

When the IDR picture has the same NAL unit type as IDR_W_RADL for each NAL unit, the IDR picture may have associated RADL pictures. In contrast, when an IDR picture has the same NAL unit type as IDR_N_LP for each NAL unit, the IDR picture may have not associated leading pictures. Meanwhile, an IDR picture may not be associated with RASL pictures.

For all picture units (PUs) following a current picture in decoding order within a CLVS (coded layer video sequence), Reference picture list 0 (e.g., RefPicList[0]) and Reference picture list 1 (e.g., RefPicList[1]) for one slice included in an IDR subpicture belonging to the picture units (PUs) may be limited not to include any picture preceding a picture including the IDR subpicture in decoding order within an active entry.

(4) RADL (Random Access Decodable Leading) Picture

A RADL picture is one of leading pictures and may have the same NAL unit type as RADL_NUT as described above with reference to Table 1.

A RADL picture may not be used as a reference picture in a decoding process of a trailing picture having the same associated TRAP picture. When field_seq_flag has a first value (e.g., 0) for a RADL picture, the RADL picture may precede all non-leading pictures having the same associated TRAP picture in decoding order. Here, field_seq_flag may indicate whether a CLVS (Coded Layer Video Sequence) conveys a picture indicating fields or a picture indicating frames. For example, field_seq_flag having a first value (e.g., 0) may indicate that the CLVS conveys the picture indicating frames. In contrast, field_seq_flag having a second value (e.g., 1) may indicate that the CLVS conveys the picture indicating fields.

(5) RASL (Random Access Skipped Leading) Picture

A RASL picture is one of leading pictures and may have the same NAL unit type as RASL_NUT as described above with reference to Table 1.

In an example, all RASL pictures may be leading pictures of an associated CRA picture. When NoIncorrectPicOutputFlag has a second value (e.g., 1) for the CRA picture, the RASL pictures refer to pictures which are not present in a bitstream and thus may not be decoded and, as a result, may not be output by an image decoding apparatus.

The RASL picture may not be used as a reference picture in a decoding process of no-RASL pictures. However, when a RADL picture belonging to the same layer as a RASL picture and associated with the same CRA picture is present, the RASL picture may be used as a collocated reference picture for inter prediction of a RADL subpicture included in the RADL picture.

When field_seq_flag has a first value (e.g., 0) for a RASL picture, the RASL picture may precede all non-leading pictures of a CRA picture associated with the RASL picture in decoding order.

(6) Trailing Picture

A trailing picture is a non-RAP picture following an associated TRAP picture or GDR picture in output order and may not be an STSA picture. In addition, the trailing picture may follow the associated TRAP picture in decoding order. That is, a trailing picture which follows an associated TRAP picture in output order but precedes the associated TRAP picture in decoding order may not be allowed.

(7) GDR(Gradual Decoding Refresh) Picture

A GDR picture is a randomly accessible picture and may have the same NAL unit type as GDR_NUT as described above with reference to Table 1.

(8) STSA(Step-Wise Temporal Sublayer Access) Picture

An STSA picture is a randomly accessible picture and may have the same NAL unit type as STSA_NUT as described above with reference to Table 1.

An STSA picture may not pictures having the same TemporalId as STSA for inter prediction. Here, TemporalId may be an identifier indicating a temporal layer, for example, a temporal sublayer in scalable video coding. In an embodiment, STSA pictures may be limited to have TemporalId greater than 0.

Pictures having the same TemporalID as an STSA picture and following the STSA picture in decoding order may not refer to pictures having the same TemporalID as the STSA picture and preceding the STSA picture in decoding order, for inter prediction. An STSA picture may activate upswitching from an immediately lower sublayer of a current sublayer, to which the STSA picture belongs, to the current sublayer.

Figure 13:
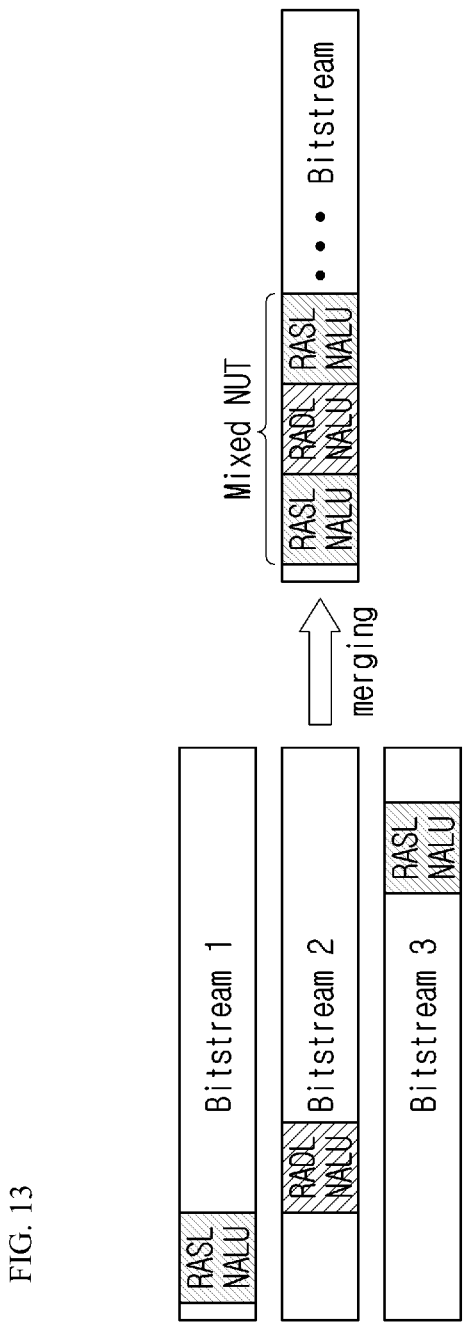
FIG. 13 is a view illustrating a process of constructing a mixed NAL unit type through subpicture bitstream merge.

FIG. 13 is a view illustrating a process of constructing a mixed NAL unit type through subpicture bitstream merge.

Referring to FIG. 13, in an image encoding process, different bitstreams Bitstream 1 to Bitstream 3 may be generated for a plurality of subpictures included in one picture. For example, when one picture includes first to third subpictures, a first bitstream Bitstream 1 may be generated for a first subpicture, a second bitstream Bitstream 2 may be generated for a second subpicture, and a third bitstream Bitstream 3 may be generated for a third subpicture. In this case, each bitstream individually generated for each subpicture may be referred to as a subpicture bitstream.

In an embodiment, for each subpicture, all coded slices may be limited to have the same NAL unit type. Therefore, all VCL NAL units included in one subpicture bitstream may have the same NAL unit type. For example, all VCL NAL units included in the first bitstream Bitstream 1 has the same NAL unit type as RASL_NUT, all VCL NAL units included in the second bitstream Bitstream 2 has the same NAL unit type as RADL_NUT, and all VCL NAL units included in the third bitstream Bitstream 3 has the same NAL unit type as RASL_NUT.

A plurality of subpictures included in a current picture may be merged in an image decoding process. That is, a plurality of subpicture bitstreams corresponding to a plurality of subpictures may be merged into a single bitstream, and a current picture may be decoded based on the single bitstream. In this case, whether a current picture has a mixed NAL unit type may be determined based on the plurality of merged subpicture bitstreams have different NAL unit types. For example, when first to third bitstreams Bitstream 1 to Bitstream 3 are merged to construct a single bitstream, a current picture may have a mixed NAL unit type based on RASL_NUT and RADL_NUT. In contrast, when the first bitstream Bitstream 1 and the third bitstream Bitstream 3 are merged to construct a single bitstream, a current picture may have a non-mixed NAL unit type based on RASL_NUT.

Figure 14:
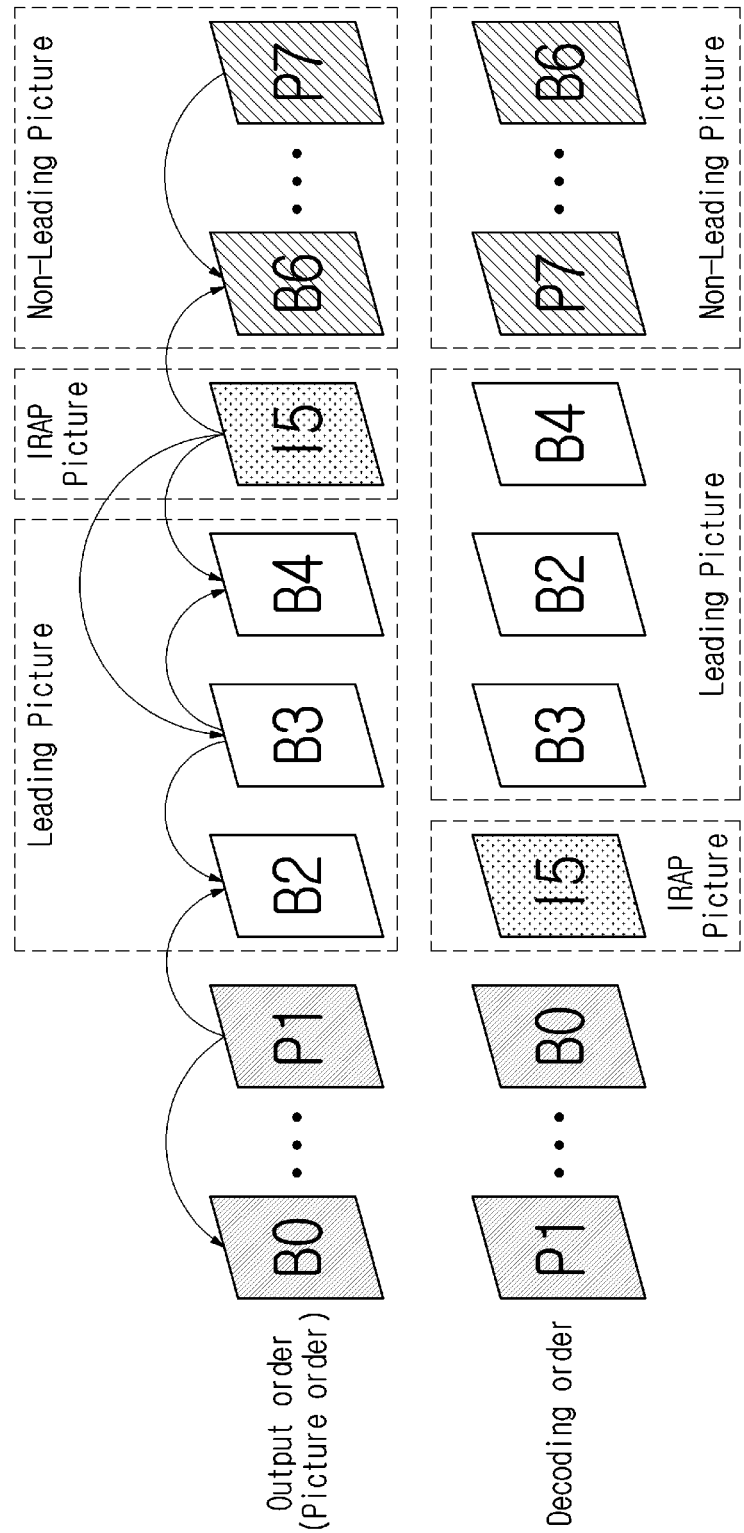
FIG. 14 is a view illustrating a decoding order and an output order for each picture type.

FIG. 14 is a view illustrating a decoding order and an output order for each picture type.

A plurality of pictures may be classified into an I picture, a P picture or a B picture according to the prediction method. The I picture may refer to a picture, to which only intra prediction is applicable, and may be decoded without referring to another picture. The I picture may be referred to as an intra picture and may include the above-described IRAP picture. The P picture may refer to a picture, to which intra prediction and unidirectional inter prediction are applicable, and may be decoded by referring to another picture. The B picture may refer to a picture, to which intra prediction and bidirectional/unidirectional inter prediction are applicable, and may be decoded using one or two other pictures. The P picture and the B picture may be referred to as an inter picture and may include the above-described RADL picture, RASL picture and trailing picture.

The inter picture may be further classified into a leading picture (LP) or a non-leading picture (NLP) according to decoding order and output order. The leading picture may refer to a picture which follows an IRAP picture in decoding order and precedes an IRAP picture in output order, and may include the above-described RADL picture and RASL picture. The non-leading picture may refer to a picture which follows an IRAP picture in decoding order and output order, and may include the above-described trailing picture.

In FIG. 14, each picture name may indicate the above-described picture type. For example, I5 picture may be an I picture and B0, B2, B3, B4 and B6 pictures may be B pictures, and P1 and P7 pictures may be P pictures. In addition, in FIG. 14, each arrow may indicate a reference direction between pictures. For example, B0 picture may be decoded by referring to P1 picture.

Referring to FIG. 14, I5 picture may be an IRAP picture, for example, a CRA picture. When random access for I5 picture is performed, I5 picture may be a first picture in decoding order.

B0 and P1 pictures may precede I5 picture in decoding order and construct a separate video sequence from I5 picture. B2, B3, B4, B6 and P7 pictures may follow I5 picture in decoding order, and construct one video sequence together with I5 picture.

B2, B3 and B4 pictures follow I5 picture in decoding order and precede I5 picture in output order and thus may be classified into the leading picture. B2 picture may be decoded by referring to P1 picture preceding I5 picture in decoding order. Accordingly, when random access for I5 picture is performed, B2 picture may not be correctly decoded by referring to P1 picture which is not present in a bitstream. A picture type such as B2 picture may be referred to as a RASL picture. In contrast, B3 picture may be decoded by referring to I5 picture preceding B3 picture in decoding order. Accordingly, when random access for I5 picture is performed, B3 picture may be correctly decoded by referring to pre-decoded I5 picture. In addition, B4 may be decoded by referring to I5 picture and B3 picture preceding B4 picture in decoding order. Accordingly, when random access for I5 picture is performed, B4 picture may be correctly decoded by referring to pre-decoded I5 picture and B3 picture. A picture type such as B3 and B4 pictures may be referred to as a RADL picture.

Meanwhile, B6 and P7 pictures follow I5 picture in decoding order and output order and thus may be classified into the non-leading picture. B6 picture may be decoded by referring to I5 picture and P7 picture preceding in decoding order. Accordingly, when random access for I5 picture is performed, B6 picture may be correctly decoded by referring to pre-decoded I5 picture and P7 picture.

In one video sequence, a decoding process and an output process may be performed in different orders based on the picture type. For example, when one video sequence includes an IRAP picture, a leading picture and a non-leading picture, the decoding process may be performed in order of the IRAP picture, the leading picture and the normal picture and the output process may be performed in order of the leading picture, the IRAP picture and the normal picture.

Hereinafter, the type of the RASL picture and treatment during random access will be described in detail.

Figure 15A:
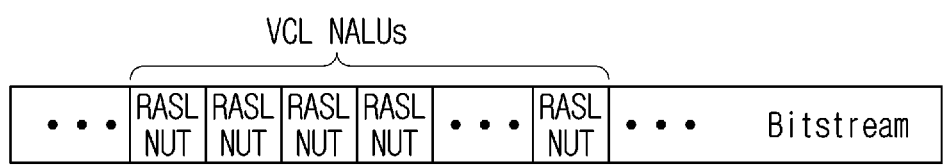
FIGS. 15a and 15b are views illustrating the type of a RASL picture according to an embodiment of the present disclosure.
Figure 15B:
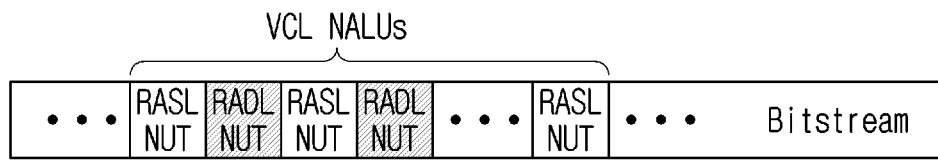

FIGS. 15a and 15b are views illustrating the type of a RASL picture according to an embodiment of the present disclosure.

First, referring to FIG. 15a, the RASL picture may have a single NAL unit type of RASL_NUT. That is, when all VCL NAL units in a bitstream have the same NAL unit type as RASL_NUT, a picture corresponding to the bitstream may be determined as a RASL picture. In the present disclosure, a RASL picture having a single NAL unit type of RASL_NUT may be referred to as a pure-RASL picture.

In addition, in an embodiment, the RASL picture may have a mixed NAL unit type of RASL_NUT and RADL_NUT. Referring to FIG. 15b, even when all VCL NAL units in a bitstream have the same NAL unit type as RASL_NUT or RADL_NUT, a picture corresponding to the bitstream may be treated as a RASL picture. In the present disclosure, a RASL picture having a mixed NAL unit type of RASL_NUT and RADL_NUT may be referred to as a mixed-RASL picture.

The RASL picture may include a pure-RASL picture (see FIG. 15a) having a single NAL unit type of RASL_NUT and a mixed-RASL picture (see FIG. 15b) having a mixed NAL unit type of RASL_NUT and RADL_NUT.

Figure 16A:
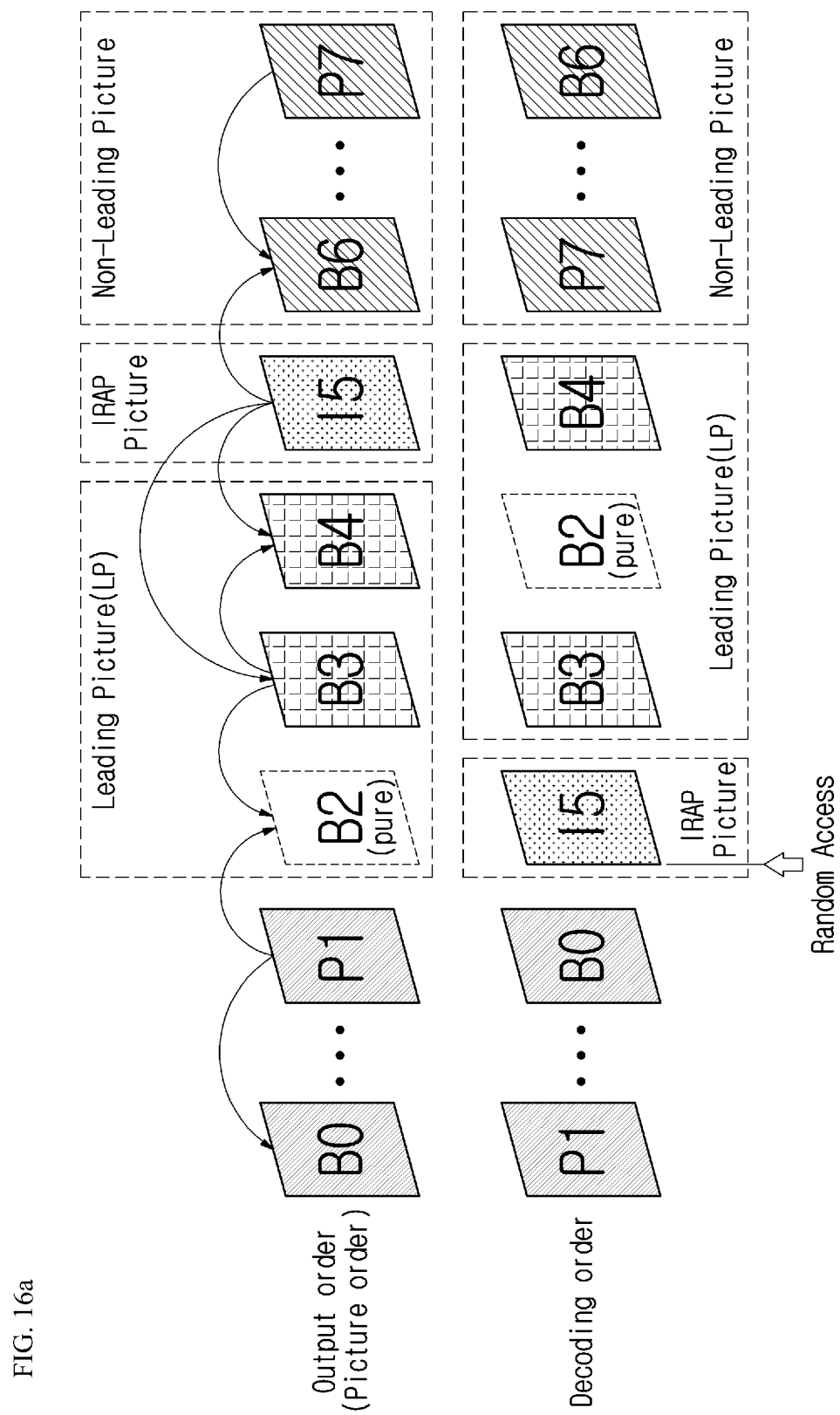
FIGS. 16a and 16b are views illustrating treatment of a RASL picture during random access.
Figure 16B:
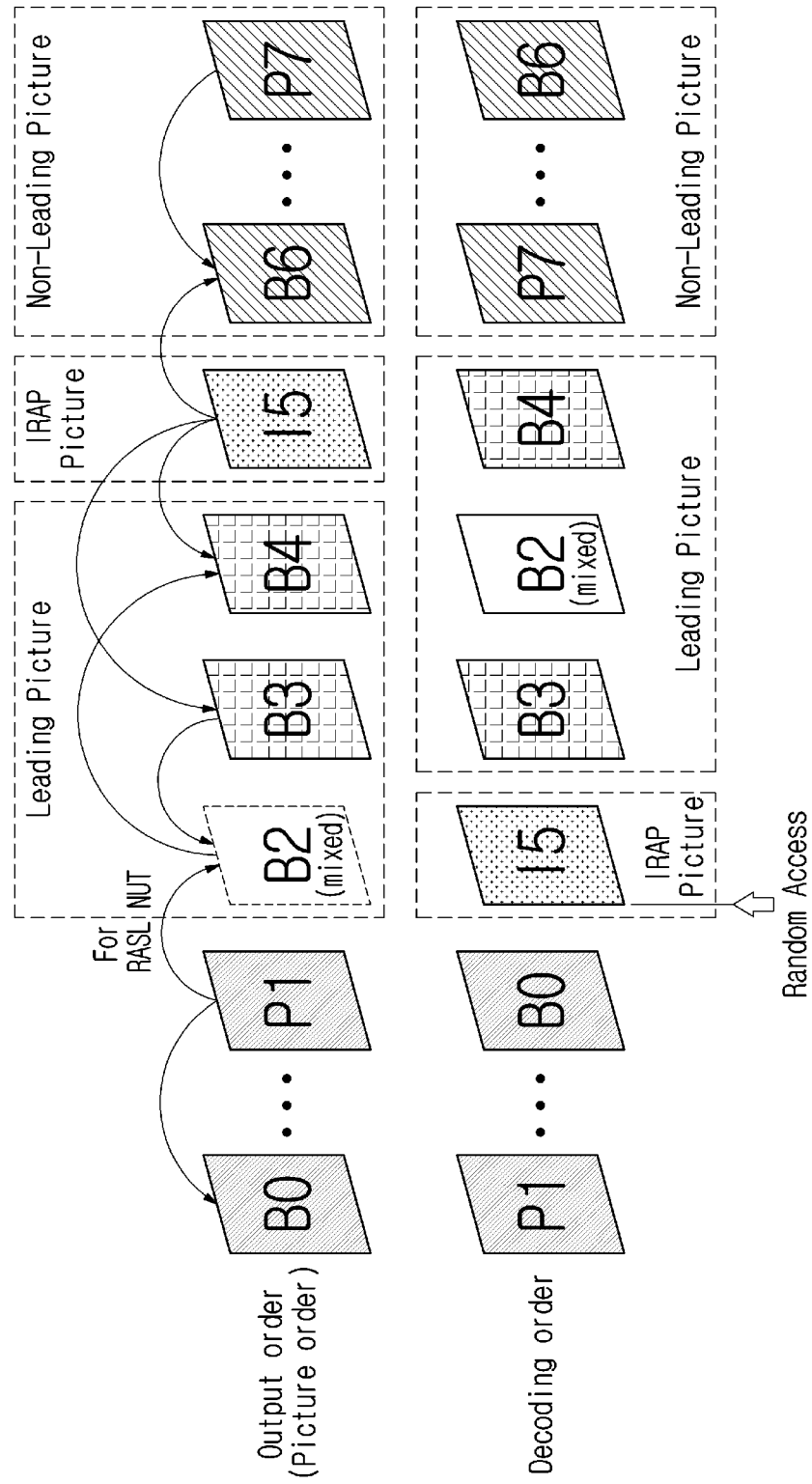

FIGS. 16a and 16b are views illustrating treatment of a RASL picture during random access. Specifically, FIG. 16a shows the case of a pure-RASL picture and FIG. 16b shows the case of a mixed-RASL picture. In FIGS. 16a and 16b, the basic configuration of a plurality of pictures, for example, a picture type and the number of pictures, has been described above with reference to FIG. 14 and thus a repeated description thereof will be omitted.

When an IRAP picture associated with a pure-RASL picture is a start point of a decoding process or random access or is a first IRAP picture in decoding order, both the decoding process and the output process of the pure-RASL picture may be skipped. As a result, the pure-RASL picture may not be used as a reference picture for inter prediction.

For example, referring to FIG. 16*a*, B2 picture may be a pure-RASL picture having a single NAL unit type of RASL_NUT. B2 picture may be associated with I5 picture which is an IRAP picture, and may be decoded by referring to P1 picture preceding I5 picture in decoding order. Accordingly, when I5 picture is a start point of random access, both the decoding process and the output process of B2 picture may be skipped and B2 picture may not be referred to by another picture.

In contrast, in an embodiment, when an IRAP picture associated with a mixed-RASL picture is a start point of a decoding process or random access or is a first TRAP picture in decoding order, only the output process of the mixed-RASL picture may be skipped. That is, the decoding process of the mixed-RASL picture may be performed and, as a result, the mixed-RASL picture may be used as a reference picture for inter prediction.

For example, referring to FIG. 16*b*, B2 picture may be a mixed-RASL picture having a mixed NAL unit type of RASL_NUT and RADL_NUT. B2 picture may be associated with I5 picture which is an TRAP picture, and first VCL NAL units having RADL_NUT in B2 picture may be decoded without referring to P1 picture preceding I5 picture in decoding order. Accordingly, when I5 is a start point of random access, the decoding process of B2 picture may be performed, and B2 picture may be referred to by another picture, for example, B4 picture.

However, since second VCL NAL units having RASL_NUT in B2 picture may be still decoded by referring to P1 picture, the decoding process of B2 picture may not ensure a correct decoding result for the second VCL NAL units. Accordingly, when I5 picture is a start point of random access, the output process of B2 picture may be skipped.

When an TRAP picture is a start point of a decoding process or random access or is a first TRAP picture in decoding order, the output process of a RASL picture associated with the TRAP picture may be skipped regardless of whether the RASL picture is a pure-RASL picture or a mixed-RASL picture. In an embodiment, whether the TRAP picture is the start point of the decoding process or random access or is the first TRAP picture in decoding order may be determined based on NoIncorrectPicOutputFlag (or, NoOutputBeforeRecoveryFlag) described above. For example, when NoIncorrectPicOutputFlag has a first value (e.g., 0), the TRAP picture may be determined to be neither the start point nor the first TRAP picture. In this case, the output process of the RASL picture associated with the TRAP picture may not be skipped. In contrast, when NoIncorrectPicOutputFlag has a second value (e.g., 1), the TRAP picture may be determined to be the start point or the first RAP picture. In this case, the output process of the RASL picture associated with the TRAP picture may be skipped.

Meanwhile, a decoding process of a RASL picture associated with the RAP picture may be skipped only when the RASL picture is a pure-RASL picture. In an embodiment, when alternative timing for a bitstream conformance test is used, a pure-RASL picture associated with a first TRAP picture in decoding order may be excluded from the decoding process.

Figure 17:
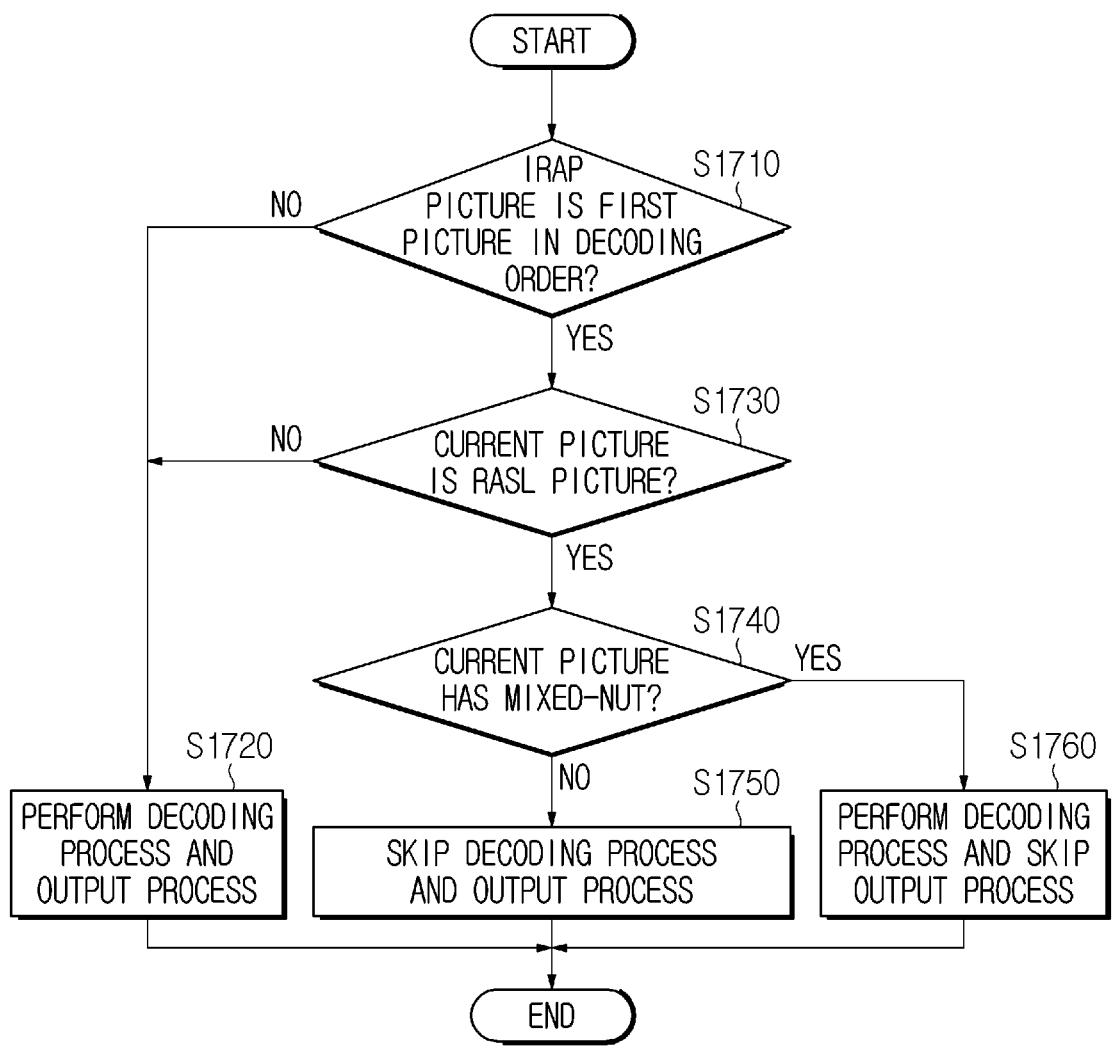
FIG. 17 is a flowchart illustrating a decoding process and an output process of a RASL picture according to an embodiment of the present disclosure.

The decoding process and the output process according to the picture type of the RASL picture is shown in FIG. 17.

FIG. 17 is a flowchart illustrating a decoding process and an output process of a RASL picture according to an embodiment of the present disclosure.

The decoding process and the output process of FIG. 17 may be performed by the image decoding apparatus of FIG. 3. For example, the decoding process may be performed by at least one of the image decoding apparatus, and the output process may be performed through an output interface of the image decoding apparatus under control of the processor.

Referring to FIG. 17, the image decoding apparatus may determine whether an TRAP picture is a first picture in decoding order (e.g., a start point of a decoding process or random access) in a current video sequence (S1710).

When the TRAP picture is not a first picture in the current video sequence ("NO" of S1710), the image decoding apparatus may perform a general decoding process and output process with respect to a current picture (S1720). For example, when the current picture is a leading picture, the current picture may be decoded after the TRAP picture but may be output before the TRAP picture. In contrast, when the current picture is a non-leading picture, the current picture may be decoded and output after the TRAP picture.

When an TRAP picture is a first picture in the current video sequence ("YES" of S1710), the image decoding apparatus may determine whether the current picture is a RASL picture (S1730).

When the current picture is not a RASL picture ("NO" of S1730), the image decoding apparatus may perform the general decoding process and output process described above with respect to the current picture (S1720).

When the current picture is a RASL picture ("YES" of S1730), the image decoding apparatus may determine whether the current picture has a mixed NAL unit type (S1740).

When the current picture does not have a mixed NAL unit type (that is, when the current picture is a pure-RASL picture)("NO" of S1740), the image decoding apparatus may skip both the decoding process and output process for the current picture (S1750). As described above, the pure-RASL picture may be decoded by referring to another picture preceding the TRAP picture in decoding order. As a result, when the TRAP picture is a first picture in decoding order, a pure-RASL picture may not be correctly decoded. Accordingly, in this case, both the decoding process and output process of the pure-RASL picture associated with the TRAP picture may be skipped.

In contrast, when the current picture has a mixed NAL unit type (that is, when the current picture is a mixed-RASL picture) ("YES" of S1740), the image decoding apparatus may skip only the output process for the current picture (S1760). As described above, the mixed-RASL picture may include at least one first subpicture having the same NAL unit type as RADL_NUT, and the first subpicture may be treated as one picture (e.g., subpic_treated_as_pic[i]=1). The first subpicture may be decoded without referring to another picture preceding the TRAP picture in decoding order, unlike the pure-RASL picture. As a result, even when the TRAP picture is a first picture in decoding order, the first subpicture may be correctly decoded. Accordingly, in this case, the decoding process for the mixed-RASL picture associated with the TRAP picture may be performed. Meanwhile, the mixed-RASL picture may further include at least one second subpicture having the same NAL unit type as RASL_NUT. The second subpicture may be decoded by referring to another picture preceding the TRAP picture in decoding order, similarly to the pure-RASL picture. As a result, when the TRAP picture is a first picture in decoding order, the second subpicture may not be correctly decoded. Accordingly, in this case, the output process for the mixed-RASL picture associated with the TRAP picture may be skipped.

As described above, when an TRAP picture is a start point of a decoding process or random access or is a first TRAP picture in decoding order, an output process of a RASL picture associated with the TRAP picture may be skipped regardless of whether the RASL picture is a pure-RASL picture or a mixed-RASL picture. In contrast, a decoding process of a RASL picture associated with the TRAP picture may be skipped only when the RASL picture is a pure-RASL picture.

Figure 18A:
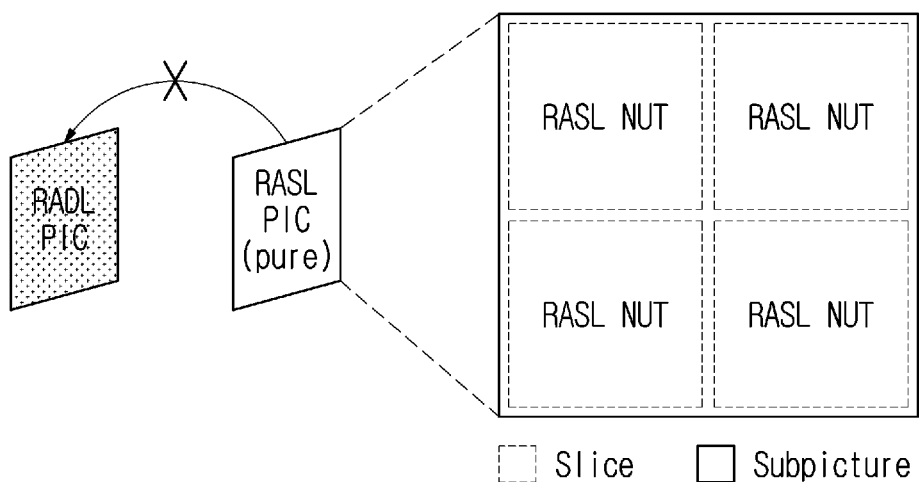
FIGS. 18a and 18b are views illustrating reference conditions of a RASL picture according to an embodiment of the present disclosure.
Figure 18B:
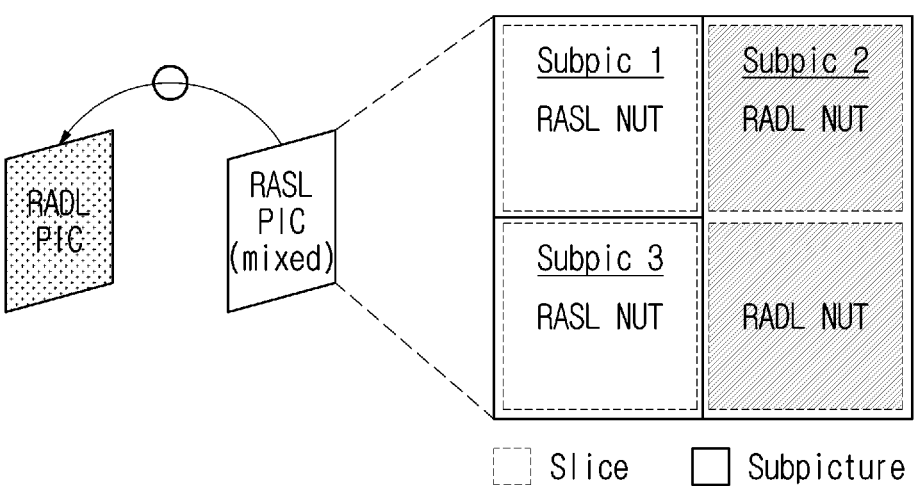

Meanwhile, although step S1710 is shown as being performed before step S1720 in FIG. 17, this may be variously modified according to the embodiment. For example, step S1710 may be performed simultaneously with step S1720 or after step S1710. FIGS. 18a and 18b are views illustrating reference conditions of a RASL picture according to an embodiment of the present disclosure. Specifically, FIG. 18a illustrates the case of a pure-RASL picture and FIG. 17b illustrate the case of a mixed-RASL picture.

Referring to FIGS. 18a and 18b, the RASL picture may be restrictively referred to by the RADL picture under predetermined reference conditions. The reference conditions of the RASL picture according to the embodiments of the present disclosure are as follows.

(1) Reference Condition 1

A RASL picture referred to by a RADL picture may be limited to a mixed-RASL picture. For example, when a RASL picture includes slice(s) having RASL_NUT, the RASL picture may not be referred to by the RADL picture (see FIG. 18a). In contrast, when a RASL picture includes both slice(s) having the same NAL unit type as RASL_NUT and slice(s) having the same NAL unit type as RADL_NUT, the RASL picture may be referred to by the RADL picture (see FIG. 18b).

(2) Reference Condition 2
  a) A RADL picture referring to a RASL picture may be limited to include at least two subpictures.
  b) In addition, each subpicture may be limited to be treated as one independent picture (e.g., subpic_treated_as_pic_flag[i]=1).
  c) In addition, a RASL picture referred to by a RADL picture may include at least two subpictures, and at least one of the subpictures may be limited to have the same NAL unit type as RADL_NUT.
  d) In addition, a subpicture having the same NAL unit type as RADL_NUT in a RASL picture may be limited to be treated as one independent picture (e.g., subpic_treated_as_pic_flag[i]=1).
  e) In addition, when a RASL picture is referred to by a specific subpicture (subpicA) in a RADL picture, a collocated subpicture of the specific subpicture subpicA in the RASL picture may be limited to a subpicture having the same NAL unit type as RADL_NUT.

For example, as shown in FIG. 18b, only a mixed-RASL picture including two or more subpictures (Subpic 1, Subpic 2 and Subpic 3), at least one (Subpic 2) of which has RADL_NUT, may be referred to by the RADL picture. In this case, in the mixed-RASL picture, a second subpicture (Subpic 2) having RADL_NUT may be treated as one independent picture. In addition, only the second subpicture (Subpic2) may be a collocated subpicture of a specific subpicture in a RADL picture.

Meanwhile, when a current picture has a mixed NAL unit type like a mixed-RASL picture, a plurality of subpicture bitstreams may be generated for a plurality of subpictures in a current picture. The plurality of subpicture bitstreams may be merged in a decoding process, thereby constructing a single bitstream. The single bitstream may be referred to as a single layer bitstream and the following constraints are applicable in order to satisfy bitstream conformance.

(Constraint 1) Each picture other than a first picture in decoding order within a bitstream is regarded as being associated with a previous IRAP picture in decoding order.
  (Constraint 2) When one picture is a leading picture of an IRAP picture, the picture shall be a RADL or RASL picture.
  (Constraint 3) When one picture is a trailing picture of an IRAP picture, the picture shall not be a RADL or RASL picture.
  (Constraint 4) Any RASL picture associated with an IDR picture shall not be present in a bitstream.
  (Constraint 5) Any RADL picture associated with an IDR picture having the same NAL unit type as IDR_N_LP shall not be present in a bitstream. In this case, when an essential parameter set to be referred to is available (within a bitstream or through an external means), by discarding all picture units (PUs) before an IRAP picture unit (PU), random access (and correct decoding of an IRAP picture and all non-RASL pictures consecutive thereto) may be possible at the position of the IRAP picture unit (PU).
  (Constraint 6) All picture preceding an IRAP picture in decoding order shall precede the IRAP picture in output order and precede all RADL pictures associated with the IRAP picture in output order.
  (Constraint 7) All RASL pictures associated with a CRA picture shall all RADL pictures associated with the CRA picture in output order.
  (Constraint 8) All RASL pictures associated with the CRA picture shall follow all IRAP pictures, which precede the CRA picture in decoding order, in output order.
  (Constraint 9) When field_seq_flag has a first value (e.g., 0) and a current picture is a leading picture associated with an IRAP picture, the picture shall precede all non-leading pictures associated with the IRAP picture in decoding order. Alternatively, for a first leading picture picA and a last leading picture picB associated with an TRAP picture, one non-leading picture preceding picA in decoding order shall be present and any non-leading picture shall not be present between picA and picB in decoding order.

Hereinafter, an image encoding/decoding method according to an embodiment of the present disclosure will be described in detail with reference to FIGS. 19 and 20.

Figure 19:
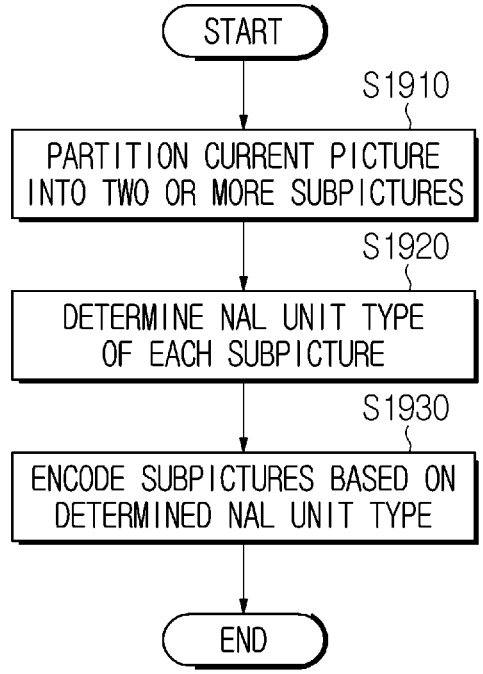
FIG. 19 is a flowchart illustrating an image encoding method according to an embodiment of the present disclosure.

FIG. 19 is a flowchart illustrating an image encoding method according to an embodiment of the present disclosure.

The image encoding method of FIG. 19 may be performed by the image encoding apparatus of FIG. 2. For example, step S1910 may be performed by the image partitioner 110, and steps S1920 and S1930 may be performed by the entropy encoder 190.

Referring to FIG. 19, the image encoding apparatus may partition the current picture into two or more subpicture (S1910). The partitioning information of the current picture may be signaled using one or more syntax elements in a high level syntax. For example, through the picture parameter set (PPS) described above with reference to FIG. 7, no_pic_partition_flag indicating whether the current picture is partitioned and pps_num_subpics_minus1 indicating the number of subpictures included in the current picture may be signaled. When the current picture is partitioned into two or more subpictures, no_pic_partition_flag may have a first value (e.g., 0), and pps_num_subpics_minus may have a value greater than 0.

Each subpicture in the current picture may be treated as one picture. When the subpicture is treated as one picture, the subpicture may be independently coded/decoded regardless of a result of encoding/decoding another subpicture. During encoding/decoding, information related to treatment of a subpicture may be signaled using a syntax element in a high level syntax. For example, through the sequence parameter set (SPS) described above with reference to FIG. 12, sps_subpic_treated_as_pic_flag[i] indicating whether each subpicture in a current picture is treated as one picture may be signaled. When an i-th subpicture in a current picture is treated as one picture in an encoding/decoding process excluding in-loop filtering operation, sps_subpic_treated_as_pic_flag[i] may have a second value (e.g., 1). Meanwhile, when sps_subpic_treated_as_pic_flag[i] is not signaled, sps_subpic_treated_as_pic_flag[i] may be inferred as having a second value (e.g., 1).

At least some of subpictures in a current picture may have different NAL unit types. For example, when a current picture includes a first subpicture and a second subpicture, the first subpicture may have a first NAL unit type and the second subpicture may have a second NAL unit type different from the first NAL unit type. An example of the NAL unit types of the subpictures was described above with reference to Table 1.

All slices included in each subpicture in a current picture may have the same NAL unit type. In the above-described example, all slices included in the first subpicture may have the first NAL unit type, and all slices included in the second subpicture may have the second NAL unit type.

The image encoding apparatus may determine the NAL unit type of each subpicture in the current picture (S1920).

In an embodiment, the NAL unit type of the subpicture may be determined based on the subpicture type. For example, when the subpicture is an TRAP subpicture, the NAL unit type of the subpicture may be determined as IDR_W_RADL, IDR_N_LP or CRA_NUT. Alternatively, when the subpicture is a RASL subpicture, the NAL unit type of the subpicture may be determined as RASL_NUT.

Meanwhile, a combination of NAL unit types of the subpictures in a current picture may be determined based on a predetermined mixture constraint condition. For example, when one or more slices in a current picture has the same NAL unit type as IDR_W_RADL, IDR_N_LP or CRA_NUT, all the other slices in the current picture may have the same NAL unit type as IDR_W_RADL, IDR_N_LP, CRA_NUT or TRAIL_NUT. In addition, when one or more slices in a current picture has the same NAL unit type such as RASL_NUT, all other slices in the current picture may have the same NAL unit type as RADL_NUT.

In an embodiment, a current picture having a mixed NAL unit type based on RASL_NUT and RADL_NUT may be treated as a RASL picture associated with a predetermined intra random access point (RAP) picture, and may be referred to as a mixed-RASL picture. Here, the IRAP picture may include a clean random access (CRA) picture.

In an embodiment, a mixed-RASL picture may be used as a reference picture of a RADL picture referring to the same IRAP picture as the mixed-RASL picture. In this case, the predetermined reference conditions described above with reference to FIGS. 18a and 18b are applicable.

The image encoding apparatus may encode the subpictures in the current picture based on the determined NAL unit type (S1930). In this case, the encoding process for each slice may be performed in coding units (CUs) based on a predetermined prediction mode, as described above. Meanwhile, each subpicture may be independently coded to construct different (subpicture) bitstreams. For example, a first (subpicture) bitstream including the encoding information of a first subpicture may be constructed and a second (subpicture) bitstream including encoding information of a second subpicture may be constructed.

According to an embodiment of the present disclosure, a picture having a mixed NAL unit type based on RASL_NUT and RADL_NUT may be treated as a RASL picture. The RASL picture may be referred to by the RADL picture under predetermined reference conditions, unlike the RASL picture having a single NAL unit type of RASL_NUT.

Figure 20:
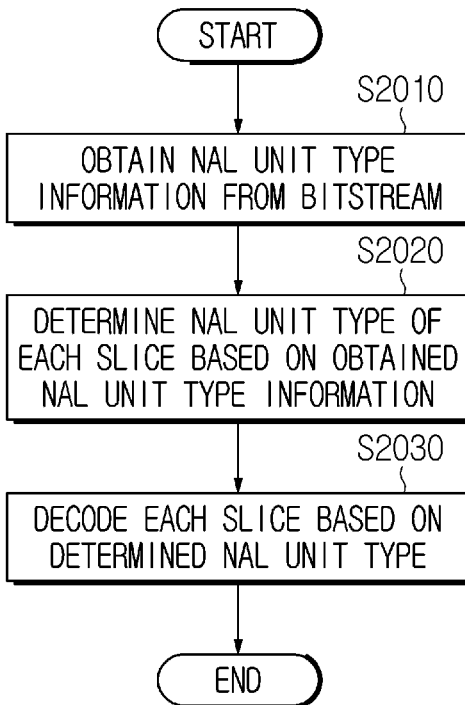
FIG. 20 is a flowchart illustrating an image decoding method according to an embodiment of the present disclosure.

FIG. 20 is a flowchart illustrating an image decoding method according to an embodiment of the present disclosure.

The image decoding method of FIG. 20 may be performed by the image decoding apparatus of FIG. 3. For example, steps S2010 and S2020 may be performed by the entropy decoder 210, and step S2030 may be performed by the dequantizer 220 to the intra predictor 265.

Referring to FIG. 20, the image decoding apparatus may acquire NAL unit type information of at least one NAL unit including coded image data from a bitstream (S2010). Here, the coded image data may include slice data, and a NAL unit including the coded image data may mean a VCL NAL unit. In addition, the NAL unit type information may include syntax elements related to a NAL unit type. For example, the NAL unit type information may include a syntax element nal_unit_type acquired from a NAL unit header. In addition, the NAL unit type information may include a syntax element pps_mixed_nalu_types_in_pic_flag acquired from a picture parameter set (PPS).

The image decoding apparatus may determine at least one NAL unit type of one or more slices in the current picture based on the acquired NAL unit type information (S2020).

When pps_mixed_nalu_types_in_pic_flag has a first value (e.g., 0), the current picture may not have a mixed NAL unit type. In this case, all slices in the current picture may have the same NAL unit type determined based on the value of nal_unit_type.

In contrast, when pps_mixed_nalu_types_in_pic_flag has a second value (e.g., 1), the current picture may have a mixed NAL unit type. In this case, the current picture may include two or more subpictures each treated as one picture. Some of the subpictures may have different NAL unit types. For example, when a current picture includes first to third subpicture, the first subpicture may have a first NAL unit type, the second subpicture may have a second NAL unit type, and the third subpicture may have a third NAL unit type. In this case, the first to third NAL unit types may be different from one another or the first NAL unit type may be equal to the second NAL type but may be different from the third NAL unit type. All slices included in the subpictures may have the same NAL unit type.

Meanwhile, a combination of the NAL unit types of the slices in the current picture may be determined based on a predetermined mixture constraint condition. For example, when one or more slices in a picture has the same NAL unit type as IDR_W_RADL, IDR_N_LP or CRA_NUT, all the other slices in the picture may have the same NAL unit type as IDR_W_RADL, IDR_N_LP, CRA_NUT or TRAIL_NUT. In addition, when one or more slices in a current picture have the same NAL unit type as RASL_NUT, all other slices in the current picture may have the same NAL unit type as RADL_NUT.

Meanwhile, when a current picture has a mixed NAL unit type, the type of the current picture may be determined based on NUT values of the slices. For example, when the slices in the current picture have NAL unit types of CRA_NUT and IDR RADL, the type of the current picture may be determined as an IRAP picture. In addition, when the slices in the current picture have NAL unit types of RASL_NUT and RADL_NUT, the type of the current picture may be determined as a RASL picture. That is, the type of the current picture may be determined to be a RASL picture based on that at least one slice in a current picture has RASL_NUT.

In an embodiment, when a current picture has a mixed NAL unit type, the current picture may be limited to have two or more subpictures. In addition, each subpic in the current picture may be limited to be treated as one picture. For example, when the current picture is a RASL picture (i.e., a mixed-RASL picture) having a mixed NAL unit type, the current picture may include two or more subpictures each treated as one picture. In this case, at least one of the subpictures may include one or more slices having the same NAL unit type as RADL_NUT.

The image decoding apparatus may decode each slice in the current picture based on the determined NAL unit type (S2030). In this case, the decoding process of each slice may be performed in coding units (CUs) based on a predetermined prediction mode as described above.

Meanwhile, when a current picture is a RASL picture and an TRAP picture associated with the current picture is a first picture in decoding order (e.g., a start point of a decoding process or random access), the current picture may be selectively decoded based on whether to include one or more slices having RADL_NUT. For example, when a current picture is a pure-RASL picture having a single NAL unit type of RASL_NUT and random access is performed with respect to an IRAP picture associated with the current picture, the decoding process of the current picture may be skipped. In contrast, when a current picture is a mixed-RASL picture having a mixed NAL unit type based on RASL_NUT and RADL_NUT and random access is performed with respect to an IRAP picture associated with the current picture, the decoding process of the current picture may be performed. Here, the IRAP picture may include a CRA picture.

In an embodiment, a mixed-RASL picture may include a plurality of subpictures. In this case, each of the subpictures may be treated as one independent picture. Information indicating whether a subpicture is treated as one independent picture may be signaled using a syntax element in a high level syntax. For example, sps_subpic_treated_as_pic_flag[i] indicating whether a current subpicture is treated as one picture may be signaled through a sequence parameter set (SPS). When the current subpicture is treated as one picture, sps_subpic_treated_as_pic_flag[i] may have a second value (e.g., 1). In addition, all slices respectively included in the subpictures may have the same NAL unit type.

In an embodiment, at least one subpicture having RADL_NUT among a plurality of subpictures included in a mixed-RASL picture may be used as a reference picture of a RADL picture associated with the same IRAP picture as the mixed-RASL picture.

In an embodiment, a first subpicture having RASL_NUT among a plurality of subpictures included in a mixed-RASL picture may precede a second subpicture having RADL_NUT among the plurality of subpictures in output order. Meanwhile, when an IRAP picture associated with a mixed-RASL picture is a first picture in decoding order (e.g., a start point of a decoding process or random access), the output process of the mixed-RASL picture may be skipped.

According to an embodiment of the present disclosure, a picture having a mixed NAL unit type based on RASL_NUT and RADL_NUT may be treated as a RASL picture. The RASL picture may be referred to as a mixed-RASL picture, and a RASL picture having a single NAL unit type of RASL_NUT may be referred to as a pure-RASL picture. When an IRPA picture associated with a mixed-RASL picture is a first picture in decoding order, only the output process of the mixed-RASL picture may be skipped. Therefore, the mixed-RASL picture may be used as a reference picture of a RADL picture under predetermined reference conditions. In this regard, the mixed-RASL picture may be different from a pure-RASL picture, the decoding process and the output process of which are both skipped.

The name of the syntax element described in the present disclosure may include information on a position where the corresponding syntax element is signaled. For example, a syntax element starting with "sps_" may mean that the corresponding syntax element is signaled in a sequence parameter set (SPS). In addition, a syntax element starting with "pps_", "ph_", "sh_" may mean that the corresponding syntax element is signaled in a picture parameter set (PPS), a picture header and a slice header, respectively.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 21:
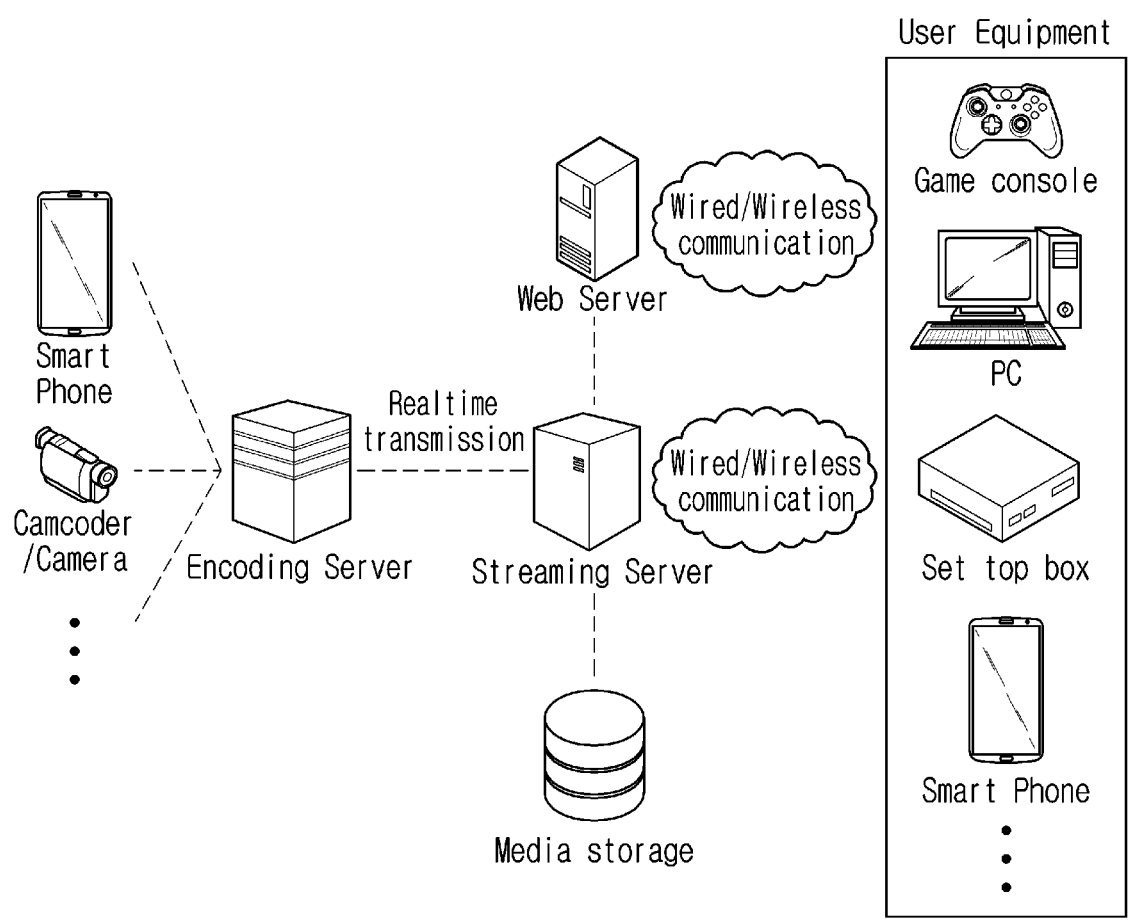
FIG. 21 is a view illustrating a content streaming system, to which an embodiment of the present disclosure is applicable.

FIG. 21 is a view illustrating a content streaming system, to which an embodiment of the present disclosure is applicable.

As shown in FIG. 21, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:
obtaining, from a bitstream, network abstraction layer (NAL) unit type information of at least one NAL unit including coded image data of a current picture;
determining a NAL unit type of each of a plurality of slices within the current picture based on the obtained NAL unit type information; and
decoding the plurality of slices based on the determined NAL unit type,
wherein the current picture is treated as a random access skipped leading (RASL) picture, based on that at least one slice among the plurality of slices has a NAL unit type equal to RASL_NUT and other slices among the plurality of slices all have a NAL unit type equal to RADL_NUT,
wherein the current picture treated as the RASL picture is referred to by a random access decodable leading (RADL) picture, based on that at least one of the plurality of slices has a NAL unit type equal to the RADL_NUT rather than the RASL_NUT, and
wherein the current picture treated as the RASL picture includes two or more subpictures, and at least one of the subpictures includes one or more slices having a NAL unit type equal to the RADL_NUT.

2. An image encoding method performed by an image encoding apparatus, the image encoding method comprising:
identifying a network abstraction layer (NAL) unit type of each of a plurality of slices within a current picture; and
encoding NAL unit type information of at least one NAL unit including coded image data of the current picture, based on the identified NAL unit type of each of the plurality of slices within the current picture,
wherein the current picture is treated as a random access skipped leading (RASL) picture, based on that at least one slice among the plurality of slices has a NAL unit type equal to RASL_NUT and other slices among the plurality of slices all have a NAL unit type equal to RADL_NUT,
wherein the current picture treated as the RASL picture is referred to by a random access decodable leading (RADL) picture, based on that at least one of the plurality of slices has a NAL unit type equal to the RADL_NUT rather than the RASL_NUT, and
wherein the current picture treated as the RASL picture includes two or more subpictures, and at least one of the subpictures includes one or more slices having a NAL unit type equal to the RADL_NUT.

3. A method of transmitting a bitstream, the method comprising:
- identifying a network abstraction layer (NAL) unit type of each of a plurality of slices within a current picture;
- encoding NAL unit type information of at least one NAL unit including coded image data of the current picture based on the identified NAL unit type of each of the plurality of slices within the current picture to obtain the bitstream; and
- transmitting the bitstream to a receiver,
- wherein the current picture is treated as a random access skipped leading (RASL) picture, based on that at least one slice among the plurality of slices has a NAL unit type equal to RASL_NUT and other slices among the plurality of slices all have a NAL unit type equal to RADL_NUT,
- wherein the current picture treated as the RASL picture is referred to by a random access decodable leading (RADL) picture, based on that at least one of the plurality of slices has a NAL unit type equal to the RADL_NUT rather than the RASL_NUT, and
- wherein the current picture treated as the RASL picture includes two or more subpictures, and at least one of the subpictures includes one or more slices having a NAL unit type equal to the RADL_NUT.

* * * * *